(12) United States Patent
Psaila et al.

(10) Patent No.: US 11,415,749 B2
(45) Date of Patent: Aug. 16, 2022

(54) OPTICAL APPARATUS AND METHODS OF MANUFACTURE THEREOF

(71) Applicant: OPTOSCRIBE LIMITED, Livingston (GB)

(72) Inventors: Nicholas D. Psaila, Livingston (GB); Anthony Traynor, Livingston (GB); Rowan Pocock, Livingston (GB); Paul Mitchell, Livingston (GB); Graeme Brown, Livingston (GB); Mark Hesketh, Livingston (GB)

(73) Assignee: OPTOSCRIBE LIMITED, Livingston (GB)

( * ) Notice: Subject to any disclaimer, the term of this patent is extended or adjusted under 35 U.S.C. 154(b) by 0 days.

(21) Appl. No.: 16/975,978

(22) PCT Filed: Feb. 27, 2019

(86) PCT No.: PCT/GB2019/050547
§ 371 (c)(1),
(2) Date: Aug. 26, 2020

(87) PCT Pub. No.: WO2019/166803
PCT Pub. Date: Sep. 6, 2019

(65) Prior Publication Data
US 2021/0003775 A1    Jan. 7, 2021

(30) Foreign Application Priority Data
Feb. 27, 2018  (GB) ...................................... 1803170

(51) Int. Cl.
*G02B 6/293* (2006.01)
*G02B 6/13* (2006.01)
(Continued)

(52) U.S. Cl.
CPC ...... *G02B 6/29331* (2013.01); *G02B 6/12002* (2013.01); *G02B 6/124* (2013.01);
(Continued)

(58) Field of Classification Search
CPC .................................................. G02B 6/29331
See application file for complete search history.

(56) References Cited

U.S. PATENT DOCUMENTS 5,970,200 A     10/1999  Takikawa et al.
10,698,164 B2 *  6/2020  Psaila .................... G02B 6/124
(Continued)

FOREIGN PATENT DOCUMENTS

CN        107561616 A  *  1/2018
EP          3091380 A1    11/2016
(Continued)

OTHER PUBLICATIONS

International Search Report and Written Opinion issued in corresponding International Application No. PCT/GB2019/050547 filed Feb. 27, 2019.

*Primary Examiner* — Charlie Y Peng
(74) *Attorney, Agent, or Firm* — Womble Bond Dickinson (US) LLP

(57) ABSTRACT

Optical apparatus and methods of manufacture thereof An optical apparatus (20) for evanescently coupling an optical signal across an (interface (30) is described. The optical apparatus (20) comprises a first substrate (22) and a second substrate (24). The optical signal is evanescently coupled between a first waveguide (26) formed by laser inscription of the first substrate (22) and a second waveguide (28) of the second substrate (22). The first waveguide (26) comprises a curved section (34) configured to provide evanescent coupling of the optical signal between the first and second waveguides (26, 28) via the interface (30).

21 Claims, 11 Drawing Sheets

(51) Int. Cl.
*G02B 6/125* (2006.01)
*G02B 6/12* (2006.01)
*G02B 6/124* (2006.01)
G02B 6/42 (2006.01)
G02B 6/122 (2006.01)
G02B 6/30 (2006.01)

(52) U.S. Cl.
CPC .............. *G02B 6/125* (2013.01); *G02B 6/13* (2013.01); *G02B 6/1223* (2013.01); *G02B 6/1228* (2013.01); *G02B 6/305* (2013.01); *G02B 6/4212* (2013.01); *G02B 6/4214* (2013.01); *G02B 6/4231* (2013.01); *G02B 6/4239* (2013.01); *G02B 2006/12038* (2013.01); *G02B 2006/12061* (2013.01); *G02B 2006/12095* (2013.01); *G02B 2006/12142* (2013.01); *G02B 2006/12147* (2013.01)

(56) References Cited

U.S. PATENT DOCUMENTS

| | | |
|---|---|---|
| 2013/0170802 A1 | 7/2013 | Pitwon |
| 2015/0268419 A1 | 9/2015 | Van Steenberge et al. |
| 2016/0131837 A1* | 5/2016 | Mahgerefteh ......... G02B 6/126 385/14 |
| 2016/0349454 A1* | 12/2016 | Zhang ..................... G02B 6/26 |
| 2017/0227711 A1* | 8/2017 | Tu ............................ G02B 6/30 |
| 2018/0172905 A1* | 6/2018 | Fortusini ................ G02B 6/125 |

FOREIGN PATENT DOCUMENTS

| | | | |
|---|---|---|---|
| GB | 1535172 A | * 12/1978 | ........... G02B 6/2821 |
| JP | 2003043275 A | 2/2003 | |

\* cited by examiner

OPTICAL APPARATUS AND METHODS OF MANUFACTURE THEREOF

CROSS-REFERENCE TO RELATED APPLICATIONS

This application is a national phase application filed under 35 U.S.C. § 371 of International Application No. PCT/GB2019/050547, filed Feb. 27, 2019, which claims priority to GB 1803170.8, filed Feb. 27, 2018, and U.S. Ser. No. 16/006,177 filed Jun. 12, 2018.

FIELD

Described embodiments relate to optical apparatus for routing optical signals, for example but not exclusively in, data communications, and methods of manufacture of such optical apparatus.

BACKGROUND

High refractive index contrast photonic integrated circuits (PICs) have applications for use as transceivers for telecommunications. PICs are typically made using platforms such as silicon or indium phosphide. Challenges exist in terms of coupling light efficiently into and out of the PICs with acceptable alignment tolerances, broad bandwidth and low polarization dependence. The high refractive index contrast of these platforms tends to result in relatively small mode field diameters compared with optical fibers which deliver light into and from the platform. The conversion efficiency between dissimilar mode sizes affects the overall coupling performance.

Two possible approaches to providing the optical coupling include grating couplers and edge couplers. Grating couplers comprise a periodic structure which causes an optical signal to be diffracted at an angle relative to the direction of the incident optical signal. Grating couplers produce similar mode sizes to optical fibers. However, grating couplers suffer from poor insertion losses, have a narrow spectral bandwidth and are restrictive in terms of the polarization of the optical signal.

Edge couplers employ spot size converter structures fabricated on top of the platform to allow the mode size to be expanded to a suitable size for coupling into an optical fiber. Edge couplers have low alignment tolerances and typically require the use of a lensed fiber to minimize losses.

This background serves only to set a scene to allow a skilled reader to better appreciate the following description. Therefore, none of the above discussion should necessarily be taken as an acknowledgement that that discussion is part of the state of the art or is common general knowledge. One or more aspects/embodiments of the invention may or may not address one or more of the background issues.

SUMMARY

According to an aspect or embodiment, there is provided an optical apparatus for evanescently coupling an optical signal across an interface between a first waveguide and a second waveguide of a second substrate. Optionally, the first waveguide may be formed by laser inscription of the first substrate. The optical apparatus may comprise the first substrate. The first waveguide may comprise a curved section configured to provide evanescent coupling of the optical signal between the first and second waveguides.

According to an aspect or embodiment, there is provided an optical apparatus. The optical apparatus may comprise a first substrate comprising a first waveguide formed by laser inscription of the first substrate. The optical apparatus may comprise a second substrate comprising a second waveguide, wherein the first waveguide comprises a curved section configured to provide evanescent coupling of an optical signal across an interface between the first and second waveguides.

In use, the optical apparatus may be configured to route an optical signal across the interface, for example, as part of a transceiver or other communication apparatus in which different optical characteristics in different parts of the transceiver or other communication apparatus may otherwise cause issues in terms of inefficient coupling of the optical signal therebetween. For example, the first and second waveguides may have different refractive indices.

The use of a glass or amorphous material in one embodiment as the first substrate may provide at least one of: improved performance, manufacturability and compatibility with photonic integrated circuit (PIC) platforms. PIC platforms and silica may have similar thermal expansion coefficients, and may be considered to be reliable and/or mechanical stable. The possibility to use 3D laser-inscribed waveguides may provide design freedoms (e.g. by utilizing the third dimension), which may improve performance and/or ease of manufacturability.

Embodiments described herein may have improved alignment tolerances compared with other approaches. The evanescent coupling approach may provide lower polarization dependence compared with other approaches. The optical apparatus may be relatively straightforward to manufacture and/or may not require any form of polishing in certain embodiments.

In some embodiments, the first waveguide may be coupled to an optical fiber (e.g. a standard optical fiber, or the like). In spite of the potentially different optical mode sizes of the optical fiber and the second waveguide, the design of the first waveguide may be such that at least one of: low insertion losses, broad spectral bandwidth transmission, low polarization dependence and relaxed alignment tolerances may be achieved.

By providing a curved section in the first waveguide, the evanescent field in the coupling region may be increased compared with non-curved waveguides. The curved section may provide improved optical coupling efficiency between the first and second waveguides compared with other methods for coupling optical signals between different waveguides. The curved section may allow the resulting evanescent field to propagate over a sufficient distance to permit additional layers to be provided between the first and second waveguides compared with if no curved section is provided. The distance of propagation facilitated by the curved section may allow the first waveguide to be inscribed in the first substrate proximal to the interface without, in some embodiments, necessarily forming part of the interface.

Some optional features of the aspect or embodiment are set out below.

The curved section may be proximal to the interface.

The interface may comprise or refer to a surface of the first substrate. The curved section may be positioned relative to the surface such that, in operation, the optical signal may be evanescently coupled between the first and second waveguides. The curvature of the curved section may be selected such as to provide, in operation, evanescent coupling of the optical signal between the first and second waveguides. For example, a radius of curvature and/or radius of curvature may vary as function of position along the first waveguide may be selected such as to provide evanescent coupling of the optical signal.

The curvature may affect the strength of the evanescent coupling. In some embodiments, a first radius of curvature may be selected such that an evanescent field propagates over a first distance between a centerline of the first and second waveguides. In some other embodiments, a second radius of curvature may be selected such that an evanescent field propagates over a second distance between a centerline of the first and second waveguides, wherein the second radius of curvature is less than the first radius of curvature and the second distance is greater than the first distance. Thus, the curvature of the curved section may be selected according to the distance between the centerlines of the first and second waveguides such that the optical signal may be evanescently coupled therebetween.

The curved section may extend in a plane parallel to a propagation direction of the evanescently coupled optical signal. The plane may be perpendicular to the interface. The curved section may be curved with respect to the surface such that the first waveguide is spaced from the surface. The spacing of the first waveguide from the surface may be such that a spatial extent (e.g. a transverse cross section of the first waveguide, or the like) of the first waveguide does not extend through the surface. The spacing between the centerline of the first waveguide and the surface may be less than 100 μm, less than 50 μm, less than 25 μm, less than 10 μm, less than 5 μm, less than 2 μm, less than 1 μm, and/or more than 10 nm, more than 25 nm, more than 50 nm, more than 100 nm, more than 0.5 μm, or the like. In an example of a laser-inscribed first waveguide, the spacing between a centerline of the first waveguide and the surface may be greater than a radius of the first waveguide along the centerline thereof.

The first waveguide may further comprise a straight section adjacent to the curved section and proximal to the interface. The first waveguide may be positionable relative to the second waveguide such that the straight section is parallel to a proximal portion of the second waveguide. A radius of curvature of the curved section may be defined by a geometrical relation between a portion of the first waveguide distal to the interface and a portion of the first waveguide proximal to the interface. The portion of the first waveguide proximal to the interface may be shaped such that an evanescent field of the optical signal may be permitted to propagate through the portion between the first and second waveguides. The curvature of the curved section may be selected such that an evanescent field extends through the interface.

The first waveguide may define a three-dimensional structure. A centerline of the first waveguide may extend in two or three dimensions. For example, the centerline may extend through a curved path in a plane perpendicular to the surface. In Cartesian coordinates, the centerline may extend in the two or more different directions selected from the X, Y and Z directions. The first waveguide may be formed in any way such that the centerline of the first waveguide follows nonlinear path through the first substrate.

The first substrate may comprise at least one of: a glass; and amorphous material.

The first waveguide may be configured to provide adiabatic evanescent coupling of the optical signal between the first and second waveguides. The first waveguide may comprise at least one characteristic along the waveguide for providing adiabatic evanescent coupling. The first waveguide may have at least one characteristic that varies along the first waveguide. For example, at least one of: transverse size, shape, refractive index, and the like may vary as function of position along the first waveguide.

The first waveguide may be configured such that at least one phase-matching region is configured such that a propagation constant of the first waveguide is the same as a propagation constant of the second waveguide. The first waveguide may comprise at least one tapered section. The tapered section may comprise at least one phase-matching region. The characteristic along the first waveguide may comprise at least one phase-matching region.

A refractive index of the first waveguide may vary as function of position along the first waveguide.

The first waveguide may have a refractive index contrast with surrounding material of the first substrate that varies as function of position along the first waveguide. The refractive index contrast may refer to a different between the refractive index of the surrounding material and the refractive index of the first waveguide. The refractive index of the first waveguide may typically be higher than the refractive index of the surrounding material.

The first waveguide may be configured such that the refractive index of part or all of the first waveguide varies, e.g. continuously varies, in a first direction and/or a second direction. The first direction may comprise a direction along the first waveguide, e.g. a propagation direction of the optical signal in the first waveguide. The second direction may comprise a direction that is perpendicular to the first direction. For example, the first waveguide may be configured such that the refractive index of part or all of the first waveguide may decrease in the first direction and/or the second direction. Alternatively or additionally, the first waveguide may be configured such that the refractive index of part or all of the first waveguide may increase in the first direction and/or the second direction. The refractive index of part or all of the first waveguide may be varied, e.g. continuously varied, in the first direction and/or the second direction, by varying, e.g. continuously varying, the refractive index contrast between part or all of first waveguide and the surrounding material. The refractive index of part or all of the first waveguide may be varied using laser inscription of the first substrate. By using laser inscription of the first substrate, the formation of a first waveguide comprising a refractive index that may vary, e.g. continuously vary, may be facilitated.

The optical apparatus may comprise a further waveguide for providing evanescent coupling between the first waveguide and the second waveguide. The further waveguide may comprise at least one of: silicon oxynitride; germanium doped silica; and silicon nitride.

The optical apparatus may further comprise the second substrate. The second waveguide of the second substrate may comprise a material of higher refractive index than the first waveguide and the further waveguide. The further waveguide may comprise a material having a higher refractive index than the first waveguide.

The optical apparatus may comprise the second substrate. The second waveguide of the second substrate may comprise a material of higher refractive index than the first waveguide. The material of the second waveguide may comprise at least one of: silicon; silicon nitride; and indium phosphide.

The second waveguide may be configured to provide adiabatic evanescent coupling of the optical signal between the first and second waveguides. The second waveguide may be configured such that the second waveguide may comprise at least one phase-matching region configured such that a propagation constant of the second waveguide is the same as a propagation constant of the first waveguide. The second waveguide may comprise at least one tapered section. The tapered section may comprise at least one phase-matching region. The second waveguide may comprise at least one characteristic along the second waveguide for providing adiabatic evanescent coupling.

The tapered section may be configured such that a width or thickness of the tapered section varies, e.g. continuously varies, in a first direction and/or a second direction. The first direction may comprise a direction along the second waveguide, e.g. a propagation direction of the optical signal in the second waveguide. The second direction may comprise a direction that is perpendicular to the first direction. For example, the tapered section may be configured such that the width of the tapered section increases or decreases in the first direction and/or the second direction.

For example, when the width or thickness of the tapered section increases in the first direction and/or the second direction, the second waveguide may comprise a constricted section. The constricted section may comprise a width or thickness, e.g. in the first direction and/or the second direction, that is smaller or narrower than a width or thickness of the tapered section, e.g. in the first direction and/or the second direction. The constricted section may be arranged spaced or at a distance from the tapered section of the second waveguide. The constricted section may be configured to filter one or more modes of the optical signal. The constricted section may be arranged to allow transmission of a single mode of the optical signal into the tapered section of the second waveguide.

The second waveguide may be configured to comprise a plurality of parts or segments. The plurality of parts or segments may be arranged along the first direction. Some or all parts or segments of the plurality of parts or segments may comprise the same refractive index or refractive index contrast with the surrounding material. The plurality of parts or segments may be arranged such that a refractive index of the second waveguide varies in the first direction and/or the second direction. For example, the second waveguide may be configured such that a size or width of some or all parts or segments of the plurality of parts or segments varies, e.g. decreases or increases, in the first direction and/or the second direction. The second waveguide may be configured such that a space or distance between at least two or all parts or segments of the plurality of parts or segments varies, e.g. decreases or increases, in the first direction.

The second waveguide may be configured such that a size or width of some or all parts or segments of the plurality of parts or segments is the same. The second waveguide may be configured such that a space or distance between at least two or all parts or segments of the plurality of parts or segments is the same. The second waveguide may be configured such that the size or width of some or all of the parts or segments of the plurality of parts or segment is smaller than a wavelength of the optical signal. The second waveguide may be configured such that the space or distance between at least two or all parts or segments of the plurality of parts or segment is smaller than a wavelength of the optical signal. Some or all of the plurality of parts or segments may be arranged along the second direction. For example, the plurality of parts or segments may be arranged to form an array of parts or segments. Some or all of the plurality of parts or segments may be considered as forming a metamaterial. The plurality of parts or segments may be arranged to vary, e.g. decrease or increase, the refractive index, e.g. the effective refractive index, of the second waveguide.

It will be appreciated that the first waveguide, e.g. the tapered section thereof, may comprise any of the features of the second waveguide and/or the tapered section of the second waveguide.

The optical apparatus may comprise an electrical component configured to at least one of: convert the optical signal into an electrical signal; and convert an electrical signal into the optical signal.

The electrical component may be configured to at least one of: transmit; and receive the optical signal via the second waveguide.

The electrical component may be configured to at least one of: transmit; and receive the optical signal such that the optical signal is routed between the first and second waveguides.

The optical apparatus may comprise a carrier configured to provide at least one of: optical, electrical and magnetic communication with the electrical component.

The first substrate may be disposed between the second substrate and the carrier.

The first substrate may comprise at least one via extending therethrough between the second substrate and the carrier.

The optical apparatus may comprise a carrier operative to communicate with an electrical component of the second substrate using an electrical signal. The first substrate may be disposed between the second substrate and the carrier. The first substrate may comprise at least one via extending therethrough between the second substrate and the carrier. The electrical component may be operative to convert received one of: the optical signal and the electrical signal into the other one of: the optical signal and the electrical signal.

The second waveguide may comprise a splitter. The splitter may comprise a plurality of transversely spaced apart tapered sections. The tapered sections may be configured to provide adiabatic evanescent coupling with the first waveguide.

The optical apparatus may comprise at least one spacing element disposed between the first and second substrates. The at least one spacing element may comprise one of: silicon oxynitride; silicon dioxide; and silicon nitride. The optical apparatus may comprise a further waveguide disposed between the first and second substrates for providing evanescent coupling between the first waveguide and the second waveguide via the further waveguide. The optical apparatus may comprise at least one recessed region in at least one layer disposed between the first and second substrates. The at least one spacing element may be provided in the at least one recessed region.

The optical apparatus may comprise a further waveguide for providing evanescent coupling with the first waveguide. The further waveguide may be provided in a removed portion of a sacrificial layer deposited on the first substrate.

Alternatively, the further waveguide may be formed on a conditioned or prepared surface of the first substrate. The surface of the first substrate may be conditioned or prepared, e.g. prior to the further waveguide being formed, such that an amount of defects or particles on the first substrate is reduced.

The further waveguide may be configured to provide adiabatic evanescent coupling of the optical signal between the first and further waveguides. The further waveguide may be configured such that the further waveguide may comprise at least one phase-matching region configured such that a propagation constant of the further waveguide is the same as a propagation constant of the first waveguide. The further waveguide may comprise at least one tapered section. The tapered section may comprise at least one phase-matching region. The optical apparatus may further comprise the second substrate, the further waveguide being provided between the first and second substrates and configured for providing evanescent coupling between the first waveguide and the second waveguide via the further waveguide. Alternatively or additionally, the further waveguide may be configured for providing evanescent coupling with the second waveguide. The further waveguide may comprise at least one characteristic along the further waveguide for providing adiabatic evanescent coupling of the optical signal between the first and further waveguides. The characteristic along the further waveguide may comprise at least one phase-matching region.

A radius of curvature of the curved section may vary as function of position along the first waveguide.

The tapered section may be configured such that a width or thickness of the tapered section varies, e.g. continuously varies, in a first direction and/or a second direction. The first direction may comprise a direction along the further waveguide, e.g. a propagation direction of the optical signal in the further waveguide. The second direction may comprise a direction that is perpendicular to first direction. For example, the tapered section may be configured such that the width or thickness of the tapered section increases or decreases in the first direction and/or the second direction.

For example, when the width or thickness of the tapered section increases in the first direction and/or the second direction, the further waveguide may comprise a constricted section. The constricted section may comprise a width or thickness, e.g. in the first direction and/or the second direction, e.g. that is smaller or narrower than a width or thickness of the tapered section, e.g. in the first direction and/or the second direction. The constricted section may be arranged spaced or at a distance from the tapered section of the further waveguide. The constricted section may be configured to filter one or more modes of the optical signal. The constricted section may be arranged to allow transmission of a single mode of the optical signal into the tapered section of the further waveguide.

The further waveguide may be configured to comprise a plurality of parts or segments. The plurality of parts or segments may be arranged in along the first direction of further waveguide. Some or all parts or segments of the plurality of parts or segments may comprise the same refractive index or refractive index contrast with the surrounding material. The plurality of parts or segments may be arranged such that a refractive index of the further waveguide varies in the first direction and/or the second direction. For example, the further waveguide may be configured such that a size or width of some or all parts or segments of the plurality of parts or segments varies, e.g. decreases or increases, in the first direction and/or the second direction. The further waveguide may be configured such that a space or distance between at least two or all parts or segments of the plurality of parts or segments varies, e.g. decreases or increases, in the first direction.

The further waveguide may be configured such that a size or width of some or all parts or segments of the plurality of parts or segments is the same. The further waveguide may be configured such that a space or distance between at least two or all parts or segments of the plurality of parts or segments is the same. The further waveguide may be configured such that the size or width of some or all of the parts or segments of the plurality of parts or segment is smaller than a wavelength of the optical signal. The further waveguide may be configured such that the space or distance between at least two or all parts or segments of the plurality of parts or segment is smaller than a wavelength of the optical signal. Some or all of the plurality of parts or segments may be arranged along the second direction. For example, the plurality of parts or segments may be arranged to form an array of parts or segments. Some or all of the plurality of parts or segments may be considered as forming a metamaterial. The plurality of parts or segments may be arranged to vary, e.g. decrease or increase, the refractive index, e.g. the effective refractive index, of the further waveguide.

It will be appreciated that the first waveguide, e.g. the tapered section thereof, may comprise any of the features of the further waveguide and/or the tapered section of the second waveguide.

The optical apparatus may comprise at least one opening. The opening may be part of or comprised in the first substrate. The opening may comprise or be provided in the form of a channel, hole, through-hole, vent or the like. The opening may be arranged to allow passage of gas from a space between the first substrate and the second substrate, e.g. when the first and second substrates are coupled together. The opening may be arranged to allow passage of a bonding material into at least part of the opening, e.g. when the first and second substrates are coupled together.

At least one of the first substrate and the second substrate may be configured or shaped to allow for coupling, e.g. complementarily coupling, with at least one other of the first substrate and the second substrate. For example, at least one of the first substrate and the second substrate may be shaped or configured to allow for butt coupling between the further waveguide, e.g. provided on the first substrate, and the second waveguide. The at least one of the first substrate and the second substrate may comprise an edge or periphery. The edge or periphery may be shaped to match, e.g. complementarily match, a further edge of the at least one other of the first substrate and second substrate. In other words, at least one of the edge and further edge may be shaped or configured such that the at least one of the edge and the further edge and the at least one other of the edge and further edge define opposing edges, e.g. to allow for complementary coupling together of the first substrate and the second substrate. This may allow for the further waveguide being brought into close proximity of the second waveguide, e.g. thereby reducing a distance between the further waveguide and the second waveguide, which may reduce losses of the optical signal over the distance between the further waveguide and the second wave guide. The second substrate may comprise a coupling portion. The coupling portion may comprise or be provided in the form of an edge coupler or edge coupling portion. The coupling portion may be arranged to allow for butt coupling between the further waveguide and the second waveguide, e.g. when the first substrate and second substrate are coupled together. The further waveguide may be arranged relative to the second waveguide such that a propagation direction of the optical signal in the further waveguide corresponds to or is the same as a propagation direction of the optical signal in the second waveguide, e.g. when the first substrate and second substrate are coupled together.

One or more of the above optional features may be provided in combination with or replace at least one corresponding feature in the aspects or embodiments set out below. The features relating to apparatus may be equally applied to methods, as appropriate and vice versa.

According to an aspect or embodiment there is provided a communication apparatus for routing an optical signal. The communication apparatus may comprise the optical apparatus of any aspect or embodiment described herein. The communication apparatus may comprise or configured to function as a transceiver, transmitter and/or receiver. The communication apparatus may comprise an optical communication device configured for optical communication with the first waveguide. The optical communication device may comprise a transceiver, receiver, transmitter, or the like. The optical communication device may be coupled to the first waveguide via at least one optical fiber. The communication apparatus may comprise an electrical component configured to provide electrical, optical and/or magnetic communication with the second waveguide. In operation, data may be communicated via optical, electrical and/or a magnetic signal such that an optical signal carrying or representative of the data may be routed between the first and second waveguides via evanescent coupling. The communication apparatus may convert a data carrying signal between one or more forms (e.g. optical, electrical, magnetic, or the like) such that an optical communication device and an electrical communication device may communicate the data.

According to an aspect or embodiment there is provided a method of manufacturing an optical apparatus for evanescently coupling an optical signal across an interface between a first waveguide, optionally formed by laser inscription of a first substrate, and a second waveguide of a second substrate. The method may comprise providing the first substrate. The method may comprise forming the first waveguide to comprise a curved section configured to provide evanescent coupling of the optical signal between the first and second waveguides.

According to an aspect or embodiment there is provided a method of manufacturing an optical apparatus. The method may comprise providing a first substrate. The method may comprise forming a first waveguide in the first substrate by laser inscription so that the first waveguide comprises a curved section. The method may comprise providing a second substrate comprising a second waveguide. The method may comprise coupling the first substrate and second substrate together so that the curved section is configured to provide evanescent coupling of an optical signal across an interface between the first waveguide and the second waveguide.

The method may comprise providing a further waveguide between the first and second substrates for providing evanescent coupling between the first waveguide and the second waveguide.

The method may comprise forming the further waveguide on a surface of the first substrate and/or second substrate.

The method may comprise preparing or conditioning the surface of the first substrate and/or second substrate, e.g. to reduce an amount of defects, such as for example cracks or microcracks, and/or particles on the surface.

The method may comprise preparing or conditioning the surface of the first substrate and/or second substrate prior to forming the further waveguide.

The method may comprise forming the first waveguide after coupling the first and second substrates together.

The method may comprise forming the first waveguide prior to coupling the first and second substrates together.

The method may comprise coupling the first substrate and the second substrate together using a welding technique, such as laser beam welding.

According to an aspect or embodiment there is provided a method of using an optical apparatus for evanescently coupling an optical signal across an interface between a first waveguide, optionally formed by laser inscription, of a first substrate and a second waveguide of a second substrate. The method may comprise transmitting an optical signal through a curved section of the first waveguide so as to evanescently couple the optical signal between the first and second waveguides.

According to an aspect or embodiment there is provided an optical apparatus for evanescently coupling an optical signal across an interface. The optical apparatus may comprise a first substrate comprising a first waveguide, optionally formed by laser inscription. The optical apparatus may comprise a second substrate comprising a second waveguide. The first waveguide may comprise a curved section configured to provide evanescent coupling of the optical signal between the first and second waveguides.

According to an aspect or embodiment there is provided a method of manufacturing an optical apparatus for evanescently coupling an optical signal across an interface. The method may comprise providing a first substrate. The method may comprise forming a first waveguide by laser inscription of the first substrate. The method may comprise providing a second substrate comprising a second waveguide. The method may comprise forming the first waveguide to comprise a curved section configured to provide evanescent coupling of the optical signal between the first and second waveguides.

According to an aspect or embodiment there is provided optical apparatus for evanescently coupling an optical signal across an interface. The optical apparatus may comprise a first substrate, optionally comprising a first waveguide formed by laser inscription of the first substrate. The optical apparatus may comprise a further waveguide. The first waveguide may comprise a curved section configured to provide evanescent coupling of the optical signal between the first and further waveguides.

The further waveguide may allow fabrication of compact photonic components with substantially higher refractive index contrast compared with solely the laser inscribed first waveguide and the second waveguide, as described herein. The optical apparatus may benefit from low loss coupling to the laser-inscribed first waveguide for further integration and low loss interfacing to optical fibers. Example applications may include the fabrication of wavelength multiplexer/demultiplexer circuits on the surface waveguide layers, which may be too large to fabricate with the lower refractive index contrast available with other laser inscribed waveguides, or the like.

The further waveguide may be used to allow low-loss efficient butt coupling to edge based spot size conversion couplers fabricated on high refractive index contrast platforms such as those made in Silicon Photonics or Indium Phosphide, or the like.

One possible application of using the further waveguide may be to act as an intermediate layer in evanescently coupling to high refractive index contrast platforms. In one example, the further waveguide may help to efficiently transfer the light from the first waveguide into a high refractive index contrast second waveguide. This approach may provide for high coupling efficiencies. Design simulations indicate that total evanescent coupling efficiencies may be above 95%.

Some optional features of the aspect or embodiment are set out below.

The further waveguide may comprise a material of higher refractive index than the first substrate.

The further waveguide may comprise at least one of: silicon oxynitride; germanium doped silica; and silicon nitride.

The further waveguide may be formed by forming, e.g. etching, a pattern in a waveguide layer deposited on the first substrate.

One or more of the above optional features may be provided in combination with or replace at least one corresponding feature in the aspects or embodiments set out below. The features relating to apparatus may be equally applied to methods, as appropriate and vice versa.

According to an aspect or embodiment there is provided a communication apparatus for routing an optical signal. The communication apparatus may comprise the optical apparatus of any aspect or embodiment described herein.

According to an aspect or embodiment there is provided a method of manufacturing an optical apparatus for evanescently coupling an optical signal across an interface. The method may comprise providing a first substrate. The method may comprise forming a first waveguide by laser inscription of the first substrate. The method may comprise providing a further waveguide. The method may comprise forming the first waveguide to comprise a curved section configured to provide evanescent coupling of the optical signal between the first and further waveguides.

According to an aspect or embodiment there is provided optical apparatus for evanescently coupling an optical signal across an interface. The optical apparatus may comprise a substrate comprising a waveguide comprising a curved section. The optical apparatus may comprise a further waveguide. The curved section of the waveguide and the further waveguide may be configured to provide evanescent coupling of the optical signal between the waveguide and the further waveguide.

Some optional features of the aspect or embodiment are set out below.

The substrate may comprise one of: a first and second substrate. The optical apparatus may further comprise the other one of: the first and second substrate.

One or more of the above optional features may be provided in combination with or replace at least one corresponding feature in the aspects or embodiments set out below. The features relating to apparatus may be equally applied to methods, as appropriate and vice versa.

According to an aspect or embodiment there is provided a method of manufacturing an optical apparatus for evanescently coupling an optical signal across an interface. The method may comprise providing a substrate comprising a waveguide comprising a curved section. The method may comprise providing a further waveguide. The curved section of the waveguide and the further waveguide may be configured to provide evanescent coupling of the optical signal between the waveguide and the further waveguide.

According to an aspect or embodiment there is provided optical apparatus for evanescently coupling an optical signal across an interface. The optical apparatus may comprise a first substrate comprising a first waveguide optionally formed by laser inscription of the first substrate. The optical apparatus may comprise a second substrate comprising a second waveguide. The optical apparatus may comprise a further waveguide provided between the first and second substrate. The first, second and further waveguides may be configured to provide evanescent coupling between the first and second waveguides via the interface.

The first waveguide may comprise a curved section configured to provide evanescent coupling of the optical signal between the first and second waveguides.

According to an aspect or embodiment there is provided a method of manufacturing an optical apparatus for evanescently coupling an optical signal across an interface. The method may comprise providing a first substrate. The method may comprise forming a first waveguide by laser inscription of the first substrate. The method may comprise providing a second substrate comprising a second waveguide. The method may comprise providing a further waveguide between the first and second substrate. The first, second and further waveguides may be configured to provide evanescent coupling between the first and second waveguides via the interface.

According to an aspect or embodiment there is provided a method of manufacturing an optical apparatus. The method may comprise providing a first substrate. The method may comprise laser inscribing a first waveguide in the first substrate. The method may comprise depositing a waveguide layer on the first substrate. The method may comprise forming a further waveguide from the waveguide layer.

Some optional features of the aspect or embodiment are set out below.

The method may comprise laser inscribing the first waveguide prior to depositing the waveguide layer.

The method may comprise laser inscribing the first waveguide subsequent to depositing the waveguide layer.

The method may comprise forming, e.g. etching, the waveguide layer such that the waveguide layer comprises different thicknesses at different locations in the waveguide layer.

The method may comprise depositing a cladding material on the waveguide layer and exposed portions of the first substrate. The method may comprise controlling the deposition of the cladding material such that at least one portion of the waveguide layer is exposed. The method may comprise removing a portion of the cladding material after deposition such that a portion of the waveguide layer is exposed. The method may comprise allowing the cladding material to be used as an interposer substrate for providing evanescent coupling between the cladding material and the further waveguide. The method may comprise introducing stress-controlled layers on the cladding material.

The method may comprise introducing stress-controlled layers on a surface of the first substrate.

The cladding material may comprise at least one of: a glass; and amorphous material.

The method may comprise providing a layer of bonding material on the cladding material and on at least one exposed portion of the waveguide layer.

The method may comprise removing excess bonding material.

The method may comprise coupling a second substrate to the layer of bonding material.

The second substrate may comprise a silicon substrate and a silica layer deposited thereon for bonding to the layer of bonding material.

The second substrate may comprise a second waveguide for positioning in the layer of bonding material.

The method may comprise forming a pattern in the waveguide material to form the further waveguide and at least one spacing element. The method may comprise depositing a cladding material on the further waveguide and exposed portions of the first substrate. The method may comprise providing a layer of bonding material on the cladding material such that the at least one spacing element protrudes from the layer of bonding material.

The method may comprise providing a second substrate comprising at least one recess formed on a surface thereof; and aligning the at least one spacing element in the corresponding at least one recess so as to permit the first and second substrates to be coupled together.

The second substrate may comprise a silicon substrate and a silica layer deposited thereon for bonding to the layer of bonding material.

The second substrate may comprise a second waveguide for positioning in the layer of bonding material.

The method may comprise depositing a sacrificial layer on the first substrate. The method may comprise laser inscribing the first waveguide in the first substrate. The method may comprise removing a portion of the sacrificial layer. The method may comprise depositing the waveguide layer on a remaining portion of the sacrificial layer and exposed portions of the first substrate. The method may comprise removing one or more parts of the waveguide layer, e.g. etching the waveguide layer, to form the further waveguide.

The sacrificial material may comprise a cladding material.

The method may comprise spin coating glass frit onto the first substrate prior to deposition of the material for forming the further waveguide.

The method may comprise planarizing at least one surface of the optical apparatus. Planarizing may comprise using chemical-mechanical polishing (CMP) or the like.

One or more of the above optional features may be provided in combination with or replace at least one corresponding feature in the aspects or embodiments set out below. The features relating to apparatus may be equally applied to methods, as appropriate and vice versa.

According to an aspect or embodiment there is provided a method of manufacturing an optical apparatus. The method may comprise providing a substrate. The method may comprise depositing a layer on the substrate. The method may comprise laser inscribing a waveguide into the substrate proximal to an interface between the substrate and the layer.

According to an aspect or embodiment there is provided optical apparatus for evanescently coupling an optical signal across an interface between a first waveguide formed by laser inscription of a first substrate and an additional waveguide. The optical apparatus may comprise the first substrate. The first waveguide may comprise a curved section configured to provide evanescent coupling of the optical signal between the first waveguide and the additional waveguide.

The additional waveguide may comprise at least one of: a further waveguide deposited on the first substrate; and a second waveguide of a second substrate.

According to an aspect or embodiment there is provided a method of manufacturing an optical apparatus. The method may comprise providing a first substrate. The method may comprise depositing a sacrificial layer on the first substrate. The method may comprise laser inscribing the first waveguide in the first substrate. The method may comprise removing a portion of the sacrificial layer to expose a portion of the first substrate. The method may comprise providing a further waveguide on the exposed portion of the first substrate.

Providing the further waveguide may comprise depositing a waveguide layer on at least one of: a remaining portion of the sacrificial layer and the exposed portion of the first substrate. Providing the further waveguide may comprise removing one or more part from the waveguide layer, e.g. etching the waveguide layer, to form the further waveguide.

The method may comprise providing a second substrate comprising a second waveguide. The first waveguide may be configured such that the first waveguide may comprise a curved section configured to provide evanescent coupling of an optical signal across an interface between the first waveguide and the second waveguide, and via the further waveguide.

The laser inscribing step may be performed one of: before the sacrificial layer is deposited on the first substrate; and after the sacrificial layer is deposited on the first substrate.

The invention includes one or more corresponding aspects, embodiments or features in isolation or in various combinations whether or not specifically stated (including claimed) in that combination or in isolation. As will be appreciated, features associated with particular recited embodiments relating to apparatus may be equally appropriate as features of embodiments relating specifically to methods of operation, manufacture or use, and vice versa.

The above summary is intended to be merely exemplary and non-limiting.

BRIEF DESCRIPTION

A description is now given, by way of example only, with reference to the accompanying drawings, in which.

DETAILED DESCRIPTION

Figure 1:
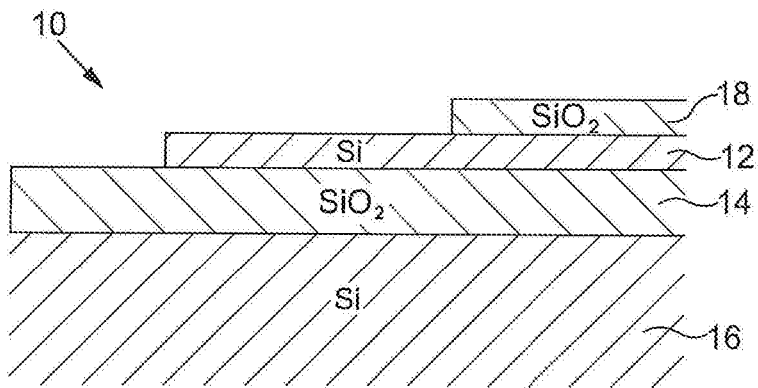
FIG. 1 shows a cross-sectional schematic view of a photonic integrated circuit (PIC) platform.

FIG. 1 shows a cross-sectional schematic view of a photonic integrated circuit (PIC) platform 10. In this embodiment, the PIC platform 10 is in the form of silicon-on-insulator (SOI) structure. The PIC platform 10 comprises a silicon layer 12 on top of an underlayer 14 formed of SiO2 (silica) deposited on top of a bulk substrate 16 comprising silicon. The silicon layer 12 provides a high refractive index contrast optical waveguide. A cladding material (in this embodiment, SiO2) 18 is deposited on the silicon layer 12. In this example, the silicon layer 12 is 220 nm thick and the underlayer 14 is 2 µm thick. It will be appreciated that any appropriate materials may be used for the PIC platform 10 and the particular configuration, number of layers and layer thicknesses may be varied as appropriate.

Figure 2:
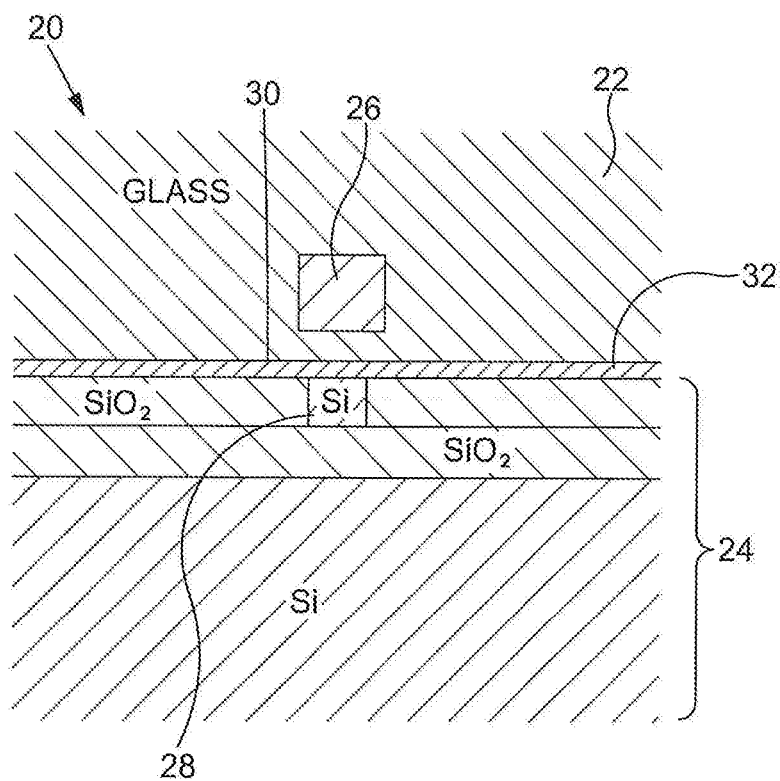
FIG. 2 shows a first cross-sectional schematic view of an optical apparatus integrated with the PIC platform of FIG. 1 according to an embodiment.

FIG. 2 shows a first cross-sectional schematic view of an optical apparatus 20 integrated with the PIC platform 10 of FIG. 1. The optical apparatus 20 comprises a first substrate 22 and a second substrate 24. In this embodiment, the first substrate 22 is made of a glass or amorphous material. However, it will be appreciated that any appropriate material or combination of materials may be used for the first substrate 22. The first substrate 22 comprises a first waveguide 26 formed by laser inscription of the first substrate 22. One example of a method for forming waveguides by laser inscription is described in WO 2008/155548, the content of which is hereby incorporated by reference in its entirety. Laser inscription can be used to produce arbitrarily shaped two-dimensional and three-dimensional waveguides in, for example, silica.

In this embodiment, the second substrate 24 comprises the PIC platform 10. The second substrate 24 comprises a second waveguide 28, which in this embodiment is in the form of the silicon layer 12. In the region of the second waveguide 28, the cladding material 18 is removed or left unpatterned, allowing the second waveguide 28 to be brought into close proximity with the first waveguide 26. The first waveguide 26 is laser inscribed along the first substrate 22 so as to be proximal to an interface 30 (i.e. a surface) of the first substrate 22. The proximity of the first waveguide 26 to the interface 30 allows the first waveguide 26 to be brought into close proximity to the second waveguide 28. It will be appreciated that the terms "proximity" and "proximal" are relative terms defining the position of part of the waveguide relative to another part of the waveguide (e.g. within the same substrate) or another waveguide (e.g. in another substrate). However, as will be described herein, the waveguide configuration may allow the waveguides in each substrate to be spaced apart while still allowing evanescent coupling to occur between the waveguides.

The first and second substrates 22, 24 are assembled using a layer of bonding material 32 provided therebetween. The bonding material 32 is in the form of epoxy but in other embodiments could comprise any other appropriate material. The bonding material 32 may be selected with a refractive index to match the refractive index of the adjacent first and second substrates 22, 24 (e.g. to reduce reflection losses).

Figure 3:
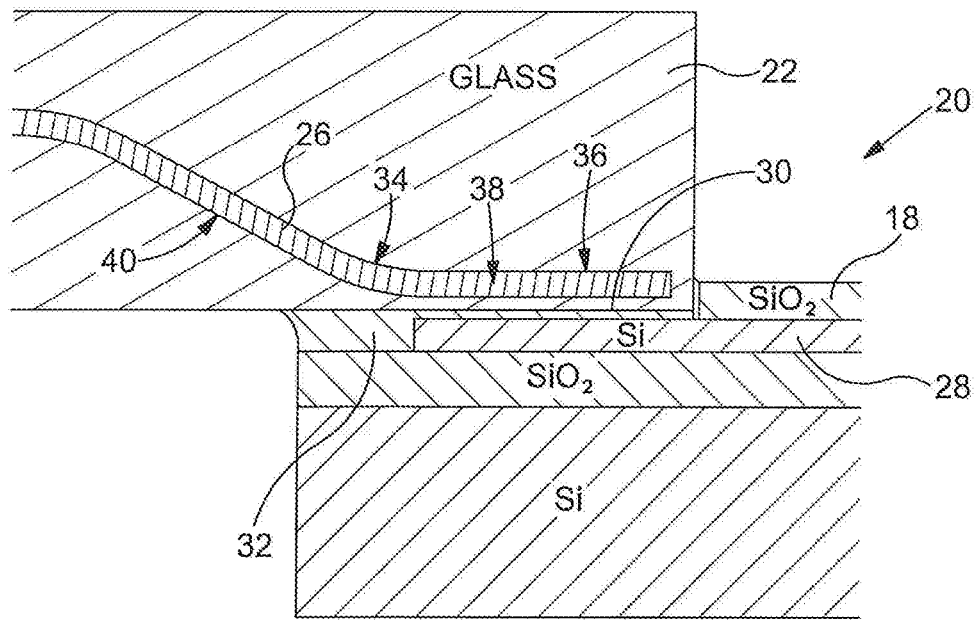
FIG. 3 shows a second, orthogonal cross-sectional schematic view of the optical apparatus and PIC platform of FIG. 2.

The optical apparatus 20 is configured for evanescently coupling an optical signal across the interface 30. As shown by FIG. 3, which shows a cross-sectional view orthogonal to the view of FIG. 2, the first waveguide 26 comprises a curved section 34 proximal to the interface 30 and configured to provide evanescent coupling of the optical signal between the first and second waveguides 26, 28. The curved section 34 extends in a plane parallel to a propagation direction of the evanescently coupled optical signal. In FIG. 3, the plane parallel to the propagation direction corresponds to the plane of the cross-section of FIG. 2. In other words, the curved section 34 may be considered as extending in a plane that is perpendicular to the interface 30, e.g. a plane defined by the interface 30. In FIG. 3, the plane is perpendicular to the interface 30 and/or may be considered as corresponding to the plane of FIG. 3. Thus, in use, an optical signal can propagate between the first and second waveguides 26, 28 via the interface 30 due to the evanescent coupling therebetween.

By controlling the path of the laser-inscribed first waveguide 26 to deliberately curve in the direction of coupling, the evanescent field in the coupling region may be increased compared with non-curved waveguides. The curved section 34 may provide improved optical coupling efficiency between the first and second waveguides 26, 28 compared with other methods for coupling optical signals between different waveguides. The curved section 34 may allow the resulting evanescent field to propagate over a sufficient distance to permit additional layers to be provided between the first and second waveguides 26, 28 compared with if no curved section 34 is provided. The distance of propagation facilitated by the curved section 34 may allow the first waveguide 26 to be inscribed in the first substrate 22 proximal to the interface 30 without necessarily forming part of the interface 30.

In this embodiment, the first waveguide 26 further comprises a straight section 36 adjacent to the curved section 34 and proximal to the interface 30. As will be described herein, the design of the first waveguide 26 may influence the coupling efficiency between the first and second waveguides 26, 28. A proximal portion 38 may therefore be defined as the portions of the first and second waveguides 26, 28 that are proximal to each other when the first and second substrates 26, 28 are coupled together. In this embodiment, the straight section 36 is parallel to the proximal portion 38 of the second waveguide 28.

A radius of curvature of the curved section 34 may be defined by a geometrical relation between a portion 40 of the first waveguide 26 distal to the interface and a portion (in this case, the part of the straight section 36 adjacent the curved section 34) of the first waveguide 26 proximal to the interface 30. The radius of curvature of the curved section 34 may vary as function of position along the first waveguide 26. The portion 40 extends at an angle from the curved section 34 away from the interface 30. It will be appreciated that the design of the first waveguide 26 may be arbitrary since the design depends on the particular requirements of the optical apparatus 20. However, the portion of the first waveguide 26 proximal to the interface is shaped such that an evanescent field of the optical signal is permitted to propagate through the portion between the first and second waveguides 26, 28.

The use of a glass or amorphous material in this embodiment as the first substrate 22 may provide at least one of: an opportunity to improve the performance, manufacturability and compatibility with PIC platforms. PIC platforms and silica may have similar thermal expansion coefficients, and may be considered to be reliable and mechanical stable. The possibility to use 3D laser-inscribed waveguides (e.g. such that a centerline of the laser-inscribed waveguide may extend in one, two or three dimensions) may provide significant design freedoms (e.g. utilizing the third dimension) to improve performance and ease of manufacturability.

Embodiments described herein may have improved alignment tolerances compared with other approaches. The evanescent coupling approach may provide lower polarization dependence compared with other approaches. The optical apparatus 10 may be relative compact (e.g. less than 200 μm), for example, due to the possibility of laser inscribing the first waveguide 26 to be very close to the interface 30. The optical apparatus 20 may be relatively straightforward to manufacture and may not require any form of polishing in certain embodiments.

In this embodiment, the first waveguide 26 may be coupled to a standard optical fiber (not shown). In spite of the potentially different optical mode sizes of the optical fiber and the second waveguide 28, the design of the first waveguide 26 may be such that at least one of: low insertion losses, broad spectral bandwidth transmission, low polarization dependence and relaxed alignment tolerances can be achieved.

Figure 4:
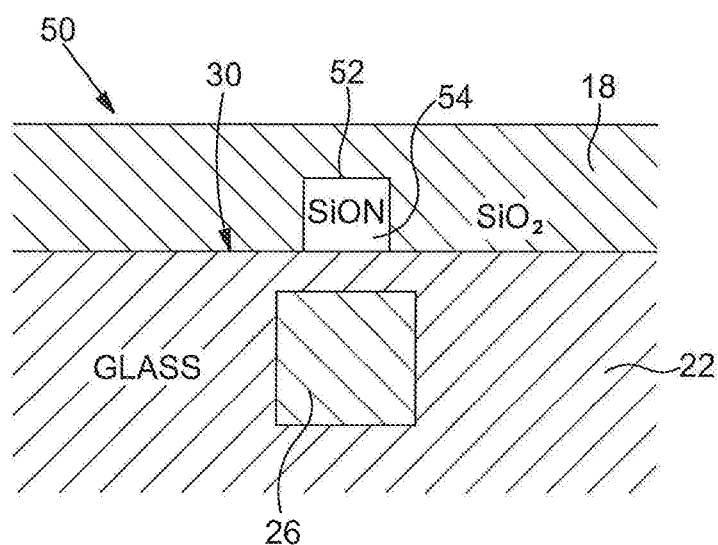
FIG. 4 shows a first cross-sectional schematic view of an optical apparatus configured according to a further embodiment.
Figure 5:
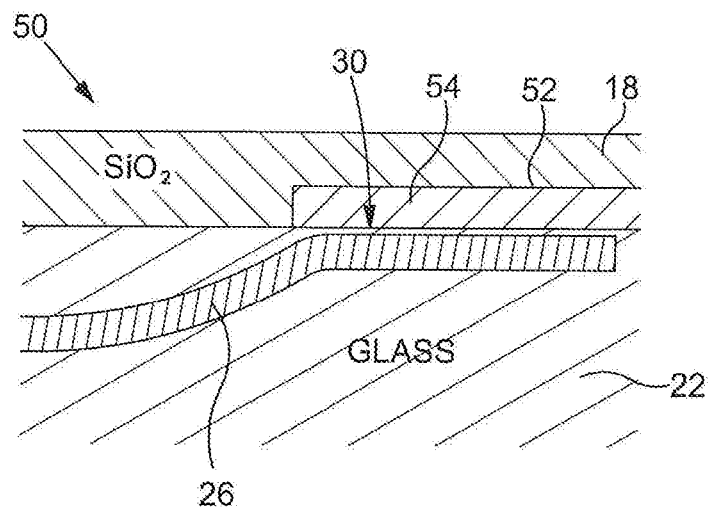
FIG. 5 shows a second, orthogonal cross-sectional schematic view of the optical apparatus of FIG. 4.

FIGS. 4 and 5 respectively show orthogonal cross-sectional schematic views of an optical apparatus 50 according to a further embodiment. The optical apparatus 50 comprises similar features to those described in relation to the optical apparatus 20 and the same reference numerals shall be used for those features. However, in contrast to the optical apparatus 20, the optical apparatus 50 does not comprise a PIC platform 10 as depicted by FIG. 1.

The optical apparatus 50 comprises a waveguide layer 52 provided on the interface 30 of the first substrate 22. In this embodiment, the waveguide layer 52 has been etched to provide a further waveguide 54 on the interface 30. The further waveguide 54 is positioned proximal to the first waveguide 26 in order to provide evanescent coupling of the optical signal between the first waveguide 26 and the further waveguide 54. In this embodiment, the further waveguide 54 comprises silicon oxynitride (SiON). It will be appreciated that other materials such as silicon nitride could be used to form the further waveguide 54. During manufacture, the waveguide layer 52 is deposited on the interface 30. A patterning process such as used in photolithography or any other appropriate technique is used to define the shape of the further waveguide 54 within the waveguide layer 52. A material removal process, such as for example etching, is then used to remove one or more parts of the waveguide layer 52 to leave behind the further waveguide 54. Subsequently, a cladding material 18 may be deposited on the further waveguide 54 and/or exposed parts of the interface 30. The optical apparatus 50 is an example of a standalone device for evanescently coupling an optical signal between the first waveguide 26 and the further waveguide 54. In an example, an input and/or output of the further waveguide 54 may be butt coupled to an external device (not shown) for sending and/or receiving between the further waveguide 54 and the external device (and thereby facilitating optical communication between the first waveguide 26 and the external device). Other embodiments described herein comprise similar features to that of the optical apparatus 50. However, in at least some of those other embodiments, the "further waveguide" is provided to improve evanescent coupling between the first waveguide and a second waveguide.

In one embodiment, the waveguide layer 52 is created using a suitable deposition technique such as plasma enhanced chemical vapour deposition (PECVD). A pattern is then projected via a mask onto the waveguide layer 52, which modifies only parts of the waveguide layer 52 that, upon removal, leave behind the further waveguide 54. Said parts of the waveguide layer 52 are removed, e.g. by using a material removal process, to form the further waveguide 54. An exemplary material removal process described herein may comprise etching, e.g. reactive ion etching (RIE) or wet etching, polishing, e.g. chemical-mechanical polishing (CMP), an abrasive process, e.g. abrasive blasting or sand blasting, or a combination thereof. It will be appreciated that any appropriate method may be used to provide the further waveguide 54 (and optional cladding material 18) on the interface 30.

Figure 6A:
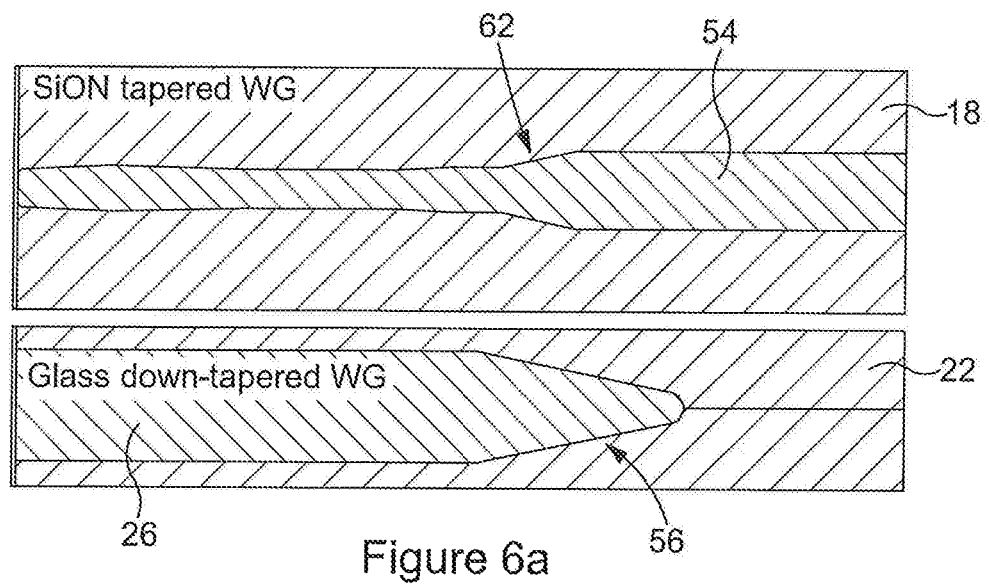
FIGS. 6a-6b show plan views of example waveguide configurations.
Figure 6B:
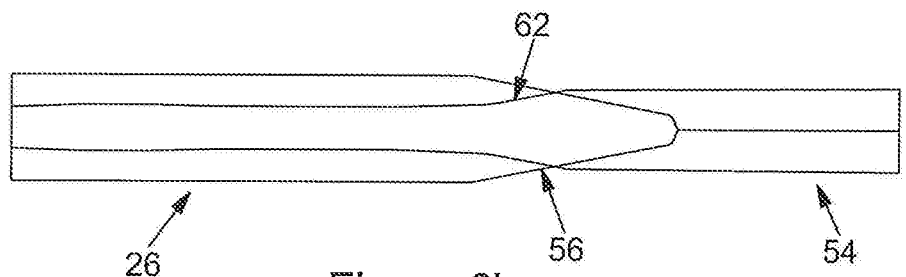

FIG. 6a shows a cross-sectional view of example waveguide configurations for use in the optical apparatus 50. In FIG. 6a, the upper figure shows an example shape for the further waveguide 54 and the lower figure shows an example shape for the first waveguide 26. FIG. 6b depicts the relative positioning (along the propagation direction of the optical signal) of the first and further waveguides 26, 54.

In this embodiment, the first waveguide 26 comprises at least one characteristic along the first waveguide 26 for providing adiabatic evanescent coupling of the optical signal between the first and further waveguides 26, 54. The characteristic along the first waveguide 26 comprises at least one phase-matching region configured such that a propagation constant of the first waveguide 26 is the same as a propagation constant of the further waveguide 54. Further, the characteristic is designed such that a constant loss is defined along the respective first and further waveguides 26, 54.

The first waveguide 26 and further waveguide 54 may comprise at least one tapered section comprising at least one phase-matching region. In this embodiment, the first waveguide 26 comprises a first tapered section 56 for providing adiabatic evanescent coupling with the further waveguide 54. The first tapered section 56 has a width that varies according to position along the first waveguide 26.

It will be appreciated that the curved section 34 cannot be identified in the plan views of FIGS. 6a-6b. However, when viewed from the side, the first tapered section 56 comprises at least part of the curved section 34 depicted in FIG. 5. Thus, while FIGS. 6a-6b depict a variation in the characteristic (e.g. tapering) along the first and further waveguides 26, 54, it will be appreciated that the characteristic may vary along the first waveguide 26 due to the curved section 34. For example, the curved section 34 may comprise a tapering in both a horizontal plane (as depicted by the view of FIGS. 6a-6b) and in a vertical plane (e.g. in a direction perpendicular to the horizontal plane). In the present example, the curved section 34 tapers inwardly towards the interface 30 in both the horizontal and vertical plane. It will be appreciated that the tapering may be in only one of the horizontal and vertical planes in some embodiments.

The first waveguide 26 may be configured in any appropriate way to facilitate coupling of the optical signal with another waveguide (e.g. a further waveguide 54 or a second waveguide 28 as described herein). For example, the refractive index of the first waveguide 26 may vary as function of position along the first waveguide 26. Alternatively or additionally, the first waveguide 26 may have a refractive index contrast with surrounding material of the first substrate 22 that varies as function of position along the first waveguide 26.

As also shown by FIGS. 6a-6b, the further waveguide 54 comprises a second tapered section 62 for providing adiabatic evanescent coupling with the first waveguide 26. It will be appreciated that the design of the first and further waveguides 26, 54 may be varied as required. For example, at least one of the first and further waveguides 26, 54 may comprise at least one tapered section, and each waveguide may have different characteristics. Depending on the characteristics of the first waveguide 26, the further waveguide 54 may be designed such that adiabatic evanescent coupling may be provided with the first waveguide 26. Equally, the first waveguide 26 may be designed such that adiabatic evanescent coupling may be provided with the further waveguide 54.

Figure 7:
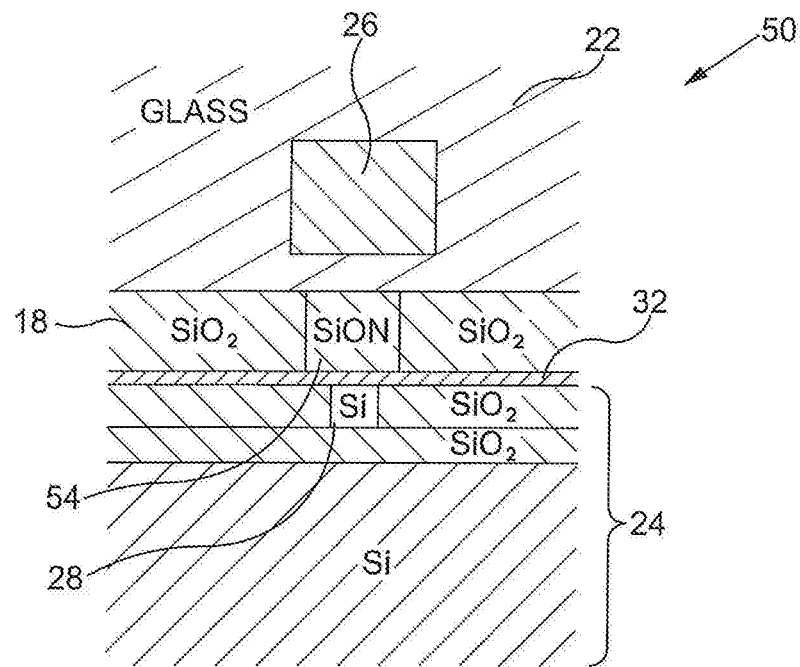
FIG. 7 shows a first cross-sectional schematic view of the optical apparatus of FIG. 4 integrated with the PIC platform of FIG. 1 according to an embodiment.
Figure 8:
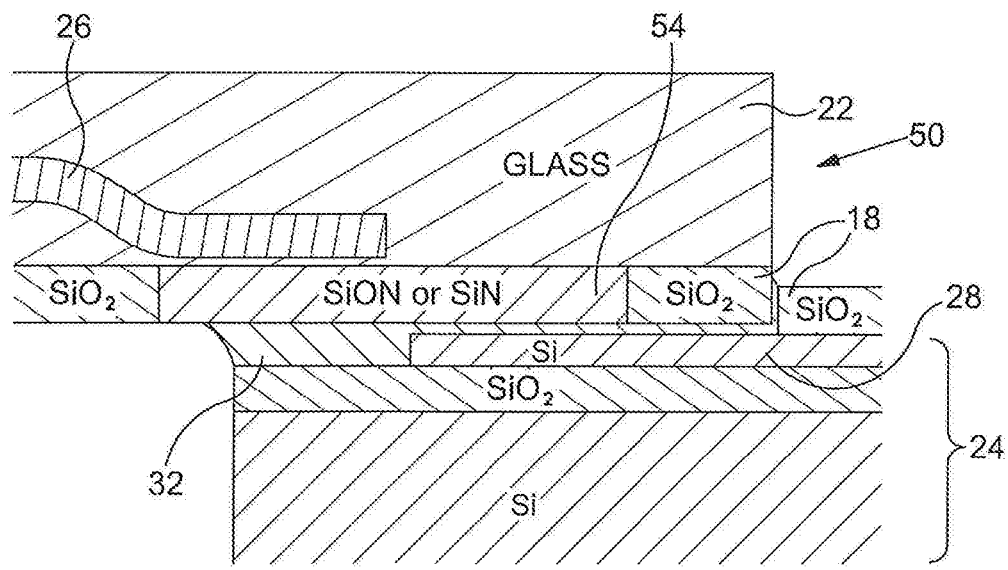
FIG. 8 shows a second, orthogonal cross-sectional schematic view of the optical apparatus and PIC platform of FIG. 7.

FIGS. 7 to 8 show orthogonal cross-sectional schematic views of the optical apparatus 50 of FIG. 4 further comprising the second substrate 24 (e.g. a PIC platform 10). The optical apparatus 50 is bonded with the second substrate 24 using a layer of bonding material 32 and thus in this embodiment, the second substrate 24 may be considered part of the optical apparatus 50. It will be appreciated that in other embodiments the optical apparatus, e.g. the first substrate and the second substrate may be coupled or bonded together using a welding technique, such as laser beam welding. This may avoid the use of the bonding material at the interface between the first substrate and the second substrate.

In the present embodiment, the second waveguide 28 comprises a material of higher refractive index than the first waveguide 26. The material of the further waveguide 54 comprises a material having a higher refractive index than the first waveguide 26 but lower than the second waveguide 28.

The surface-deposited further waveguide 54 may allow fabrication of compact photonic components with substantially higher refractive index contrast compared with solely the laser inscribed first waveguide 26 and the second waveguide 28. The optical apparatus 50 may benefit from low loss coupling to the laser-inscribed first waveguide 26 for further integration and low loss interfacing to optical fibers (not shown). Example applications include the fabrication of wavelength multiplexer/demultiplexer circuits on the surface waveguide layers, which may be too large to fabricate with the lower refractive index contrast available with other laser inscribed waveguides.

The surface-deposited further waveguide 54 may be used to allow low-loss efficient butt coupling to edge based spot size conversion couplers fabricated on high refractive index contrast platforms such as those made in Silicon Photonics or Indium Phosphide. It will be understood that one or more of the benefits of the optical apparatus 50 may be applicable to the optical apparatus 50 with or without the second substrate 24 or PIC platform 10. In other words, in some embodiment the optical apparatus 50 (or one or more parts thereof) may be used or useable with one or more high refractive index contrast platforms such as those made in Silicon Photonics or Indium Phosphide.

One possible application of using the surface deposited further waveguide 54 formed using the waveguide layer 52 may be to act as an intermediate layer in evanescently coupling to high refractive index contrast platforms. In this case, this further waveguide 54 may help to efficiently transfer the light from the first waveguide 26 into the high refractive index contrast second waveguide 28. This approach may provide for high coupling efficiencies. Design simulations indicate that total evanescent coupling efficiencies may be above 95%.

Figure 9:
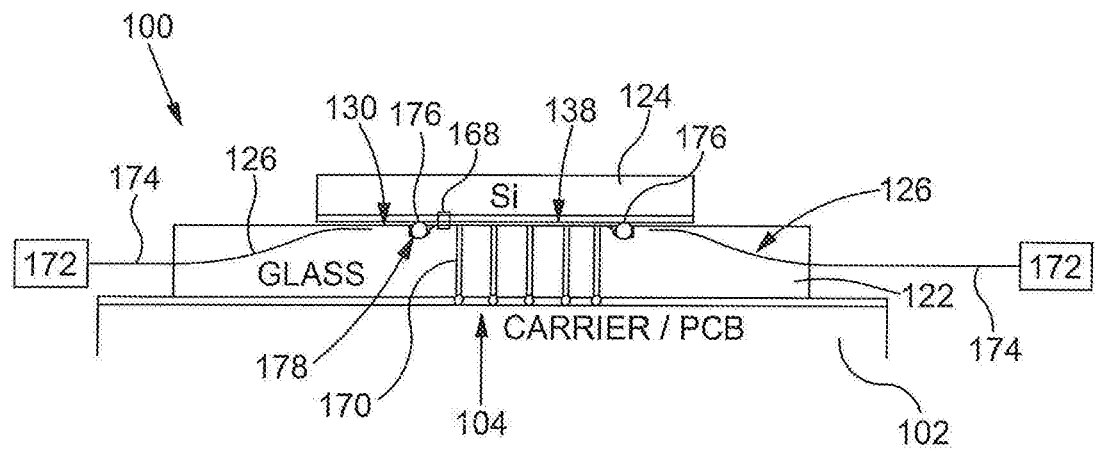
FIG. 9 shows a cross-sectional schematic view of an assembly of an optical apparatus, PIC platform and printed circuit board (PCB) according to an embodiment.

FIG. 9 shows a cross-sectional schematic view of an assembly of an optical apparatus 100. The optical apparatus 100 is similar to the other optical apparatus 20, 50 described herein and similar features are indicated with reference numerals incremented by 100. The optical apparatus 100 comprises a first substrate 122 and second substrate 124. The optical apparatus 100 further comprises a printed circuit board (PCB) 102. The first substrate 122 is sandwiched between the PCB 102 and the second substrate 124. The PCB 102 comprises a carrier 104 operative to communicate with an electrical component 168 of the second substrate 124 using an electrical signal. The first substrate 124 comprises vias 170 extending therethrough between the second substrate 124 and the carrier 104. The vias 170 comprise metal contacts extending through apertures formed in the first substrate 122. The vias 170 therefore provide an electrical connection between the PCB 102 and the electrical component 168. The electrical component 168 is operative to convert received one of: the optical signal and the electrical signal into the other one of: the optical signal and the electrical signal. In other words, the optical apparatus 100 may function as an optical signal to electrical signal transceiver. In this example, two waveguides 126 extend from the proximal region 138 so as to be coupled into respective optical devices 172 (e.g. lasers, photodiodes, or the like) via respective optical fibers 174. Solder 176 is provided in etched recesses 178 in the interface 130 are used to couple the first substrate 122 to the second substrate 124. FIG. 9 may be considered as an example of a communication apparatus for routing an optical signal.

Figure 10:
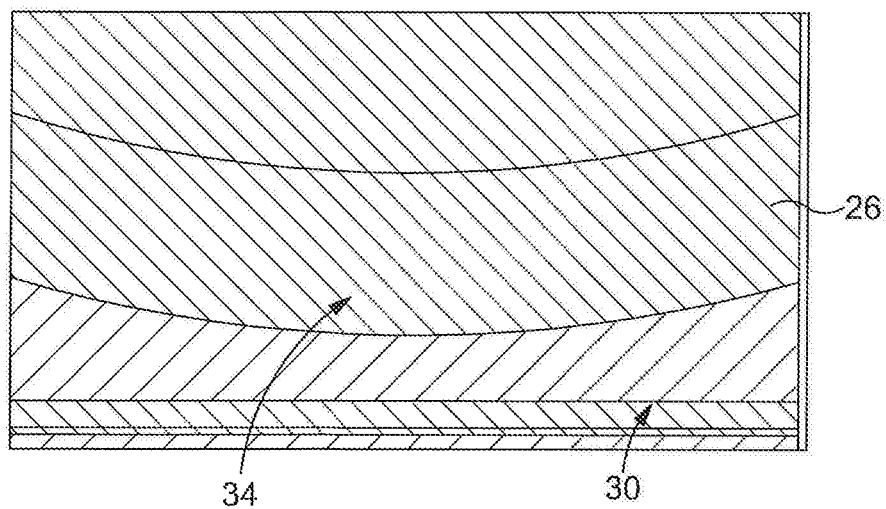
FIG. 10 shows a cross-sectional view of an example waveguide configuration for use in the optical apparatus of any embodiment described herein.

FIG. 10 shows a cross-sectional view of an example configuration for the first waveguide 26 for use in the optical apparatus of any embodiment described herein. The first waveguide 26 comprises a curved section 34. However, in contrast to FIGS. 2 to 3, the first waveguide 26 does not comprise a similar straight section 36. The first waveguide 26 has a radius of curvature that varies as function of position along the first waveguide 26, which may provide for different propagation characteristics between the first and second waveguides 26, 28 (and/or the further waveguide 54). The curved section 34 is such that the first waveguide 26 extends towards and away from the interface 30 in a plane parallel to the propagation direction of the evanescent field.

Figure 11:
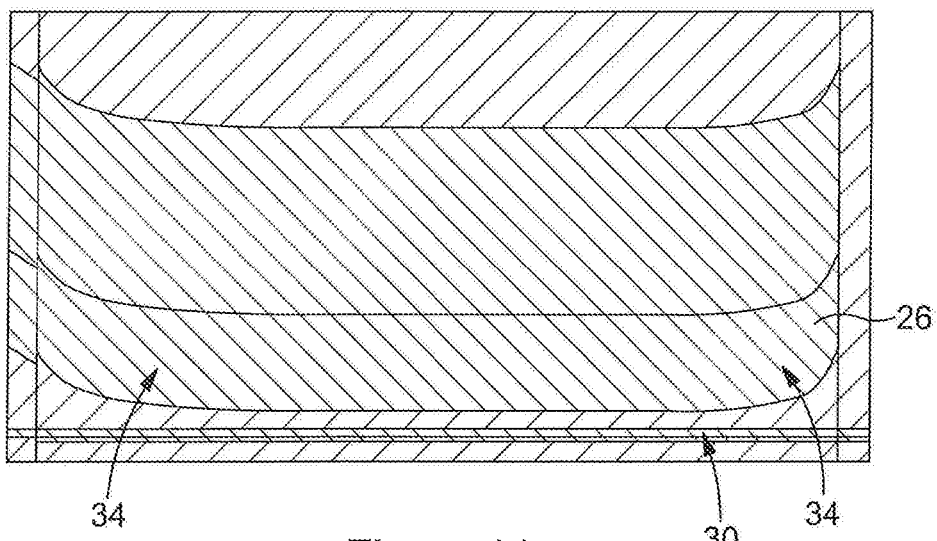
FIG. 11 shows a cross-sectional view of a further example waveguide configuration for use in the optical apparatus of any embodiment described herein.

FIG. 11 shows a cross-sectional view of a further example configuration example configuration for the first waveguide 26 for use in the optical apparatus of any embodiment described herein. The first waveguide 26 is similar to FIG. 10. The first waveguide 26 has a radius of curvature that varies as function of position along the first waveguide 26, which may provide for different propagation characteristics between the first and second waveguides 26, 28 (and/or the further waveguide 54). For example, the evanescent field between the first and second waveguides 26, 28 (and/or the further waveguide 54) may be enhanced and/or extend the length over which sufficiently strong evanescent coupling of the optical signal may occur. Therefore, by optimising the radius of curvature of the curved section 34 as function of position along the first waveguide 26 may provide for different, enhanced or improved propagation characteristics of the evanescently coupled optical signal between the first waveguide 26 and the second waveguide 28 and/or the further waveguide 54.

Figure 12:
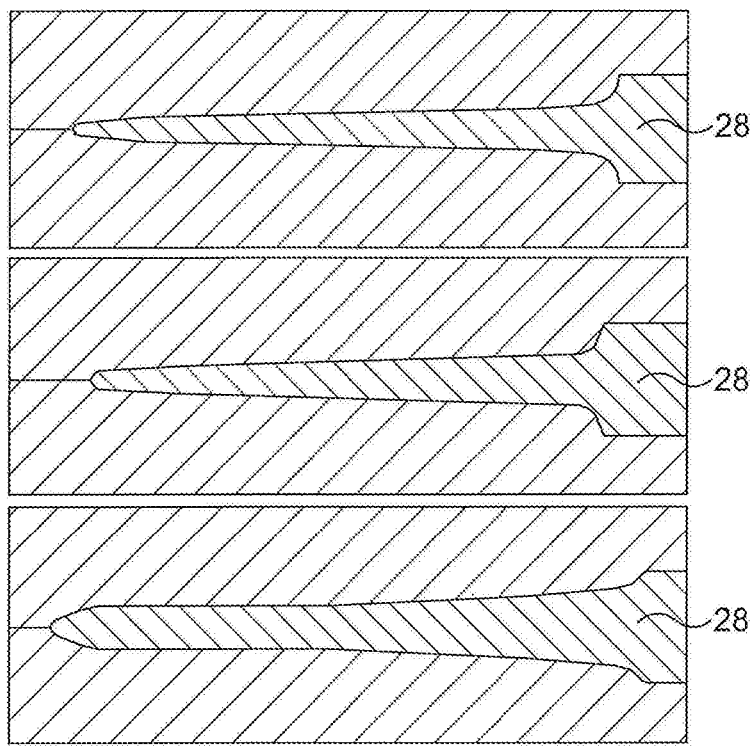
FIG. 12 shows cross-sectional views of an example waveguide configurations for use in the PIC platform of any embodiment described herein.
Figure 13:
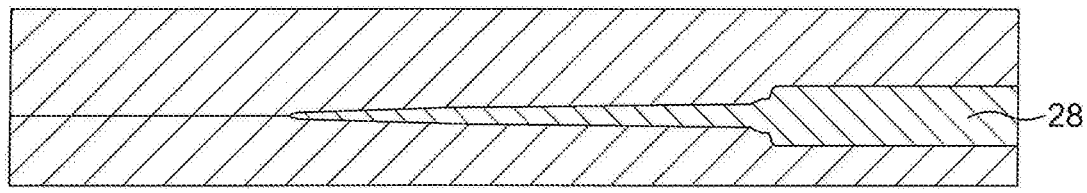
FIG. 13 shows a cross-sectional view of a further example waveguide configuration for use in the PIC platform of any embodiment described herein.

FIGS. 12 to 13 show various cross-sectional views of example configurations for the second waveguide 28 for use in the PIC platform 10. Each depicted second waveguide 28 has a different width along the second waveguide 28, the design of which may depend on the design of the first waveguide 26 and/or their proximity and relative positioning.

Figure 14:
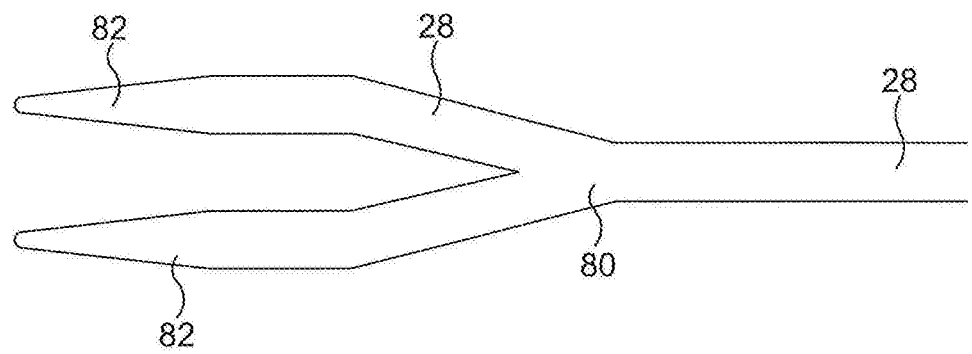
FIG. 14 shows a cross-sectional view of an example waveguide configuration for use in the PIC platform of any embodiment described herein.

FIG. 14 shows a cross-sectional view of an example configuration of the second waveguide 28 for use in the PIC platform of any embodiment described herein. In the present embodiment, the second waveguide 28 comprises a splitter 80 provided in optical communication with a plurality (two in this embodiment) of transversely spaced apart (with respect to the interface 30) tapered sections 82 for providing adiabatic evanescent coupling with the first waveguide 26. The split structure of the second waveguide 28 may provide more lateral alignment tolerance compared with if only one tapered section is provided. Thus, if the relative lateral alignment of the first and second waveguides 26, 28 is not accurate, the additional tolerance provided by the, effectively two, second waveguides 28 may ease the alignment requirements.

Figure 15:
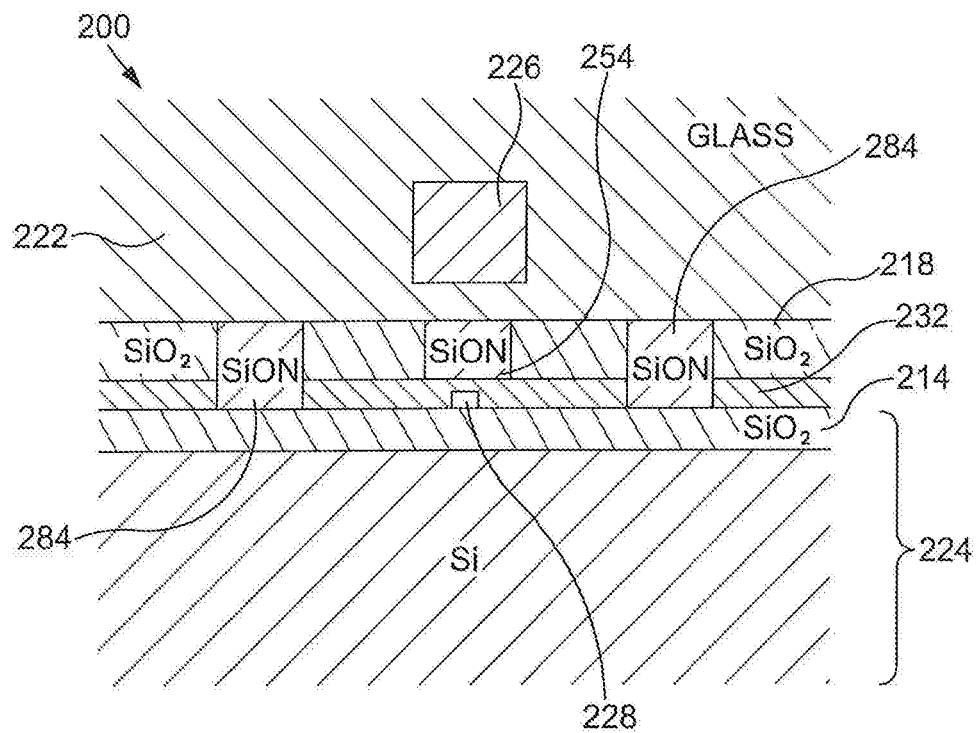
FIG. 15 shows a cross-sectional schematic view of an optical apparatus configured to be integrated with a PIC platform according to a further embodiment.

FIG. 15 shows a cross-sectional schematic view of an optical apparatus 200 configured to be integrated with a PIC platform according to a further embodiment. The embodiment of FIG. 15 is very similar to the optical apparatus 50 described herein but with similar features indicated by reference numerals incremented by 200. Different features are described herein.

The optical apparatus 200 comprises a plurality of spacing elements 284 disposed between the first and second substrates 222, 224. In this example, the spacing elements 284 comprise silicon oxynitride but could comprise any other appropriate material such as silicon nitride. A further waveguide 254 for providing enhanced evanescent coupling is provided between the first waveguide 226 and the second waveguide 228. A layer of bonding material 232 is provided between a silica layer 214 of the second substrate 224 and a corresponding cladding material 218 of the first substrate 222. The spacing elements 284 may ensure that the spacing between the first and second waveguides 226, 228 and/or the further waveguide 254 is appropriate to provide optimum evanescent coupling therebetween.

Figure 16:
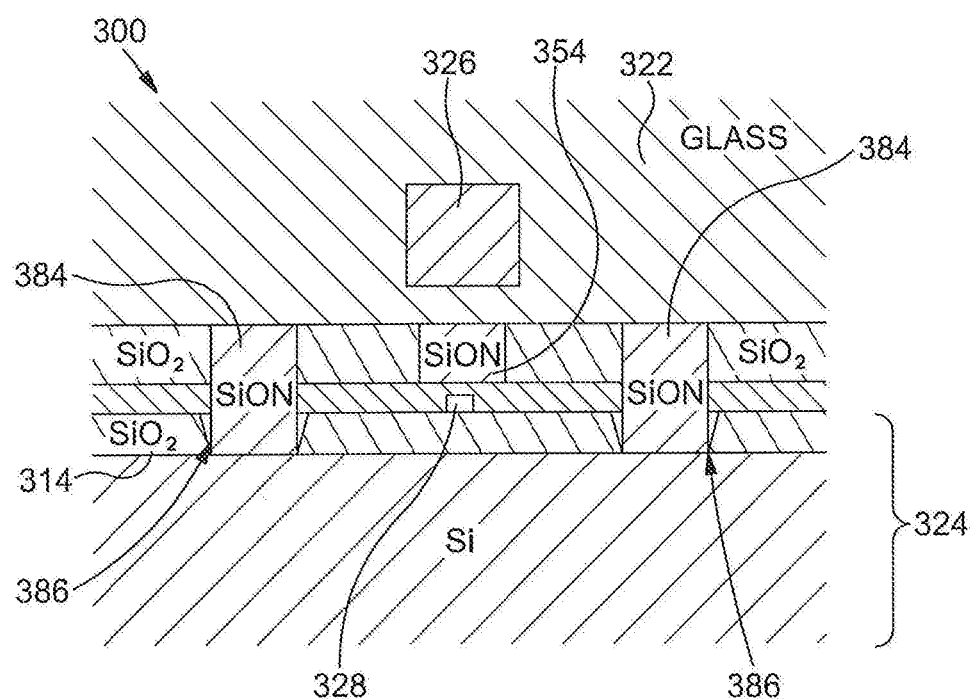
FIG. 16 shows a cross-sectional schematic view of an optical apparatus configured to be integrated with a PIC platform according to a further embodiment.

FIG. 16 shows a cross-sectional schematic view of an optical apparatus 300 configured to be integrated with a PIC platform according to a further embodiment. The embodiment of FIG. 16 is very similar to the optical apparatus 200 described herein but with similar features indicated by reference numerals incremented by 100. Different features are described herein.

The optical apparatus 300 comprises a plurality of recessed regions 386 in at least one layer (in this embodiment, the silica layer 314) disposed between the first and second substrates 322 and 324, wherein the plurality of spacing elements 384 are provided in the corresponding recessed regions 386. Providing the spacing elements 384 and recessed regions 386 may facilitate accurate and timely alignment of the first, second and further waveguides 326, 328 and 354.

Figure 17:
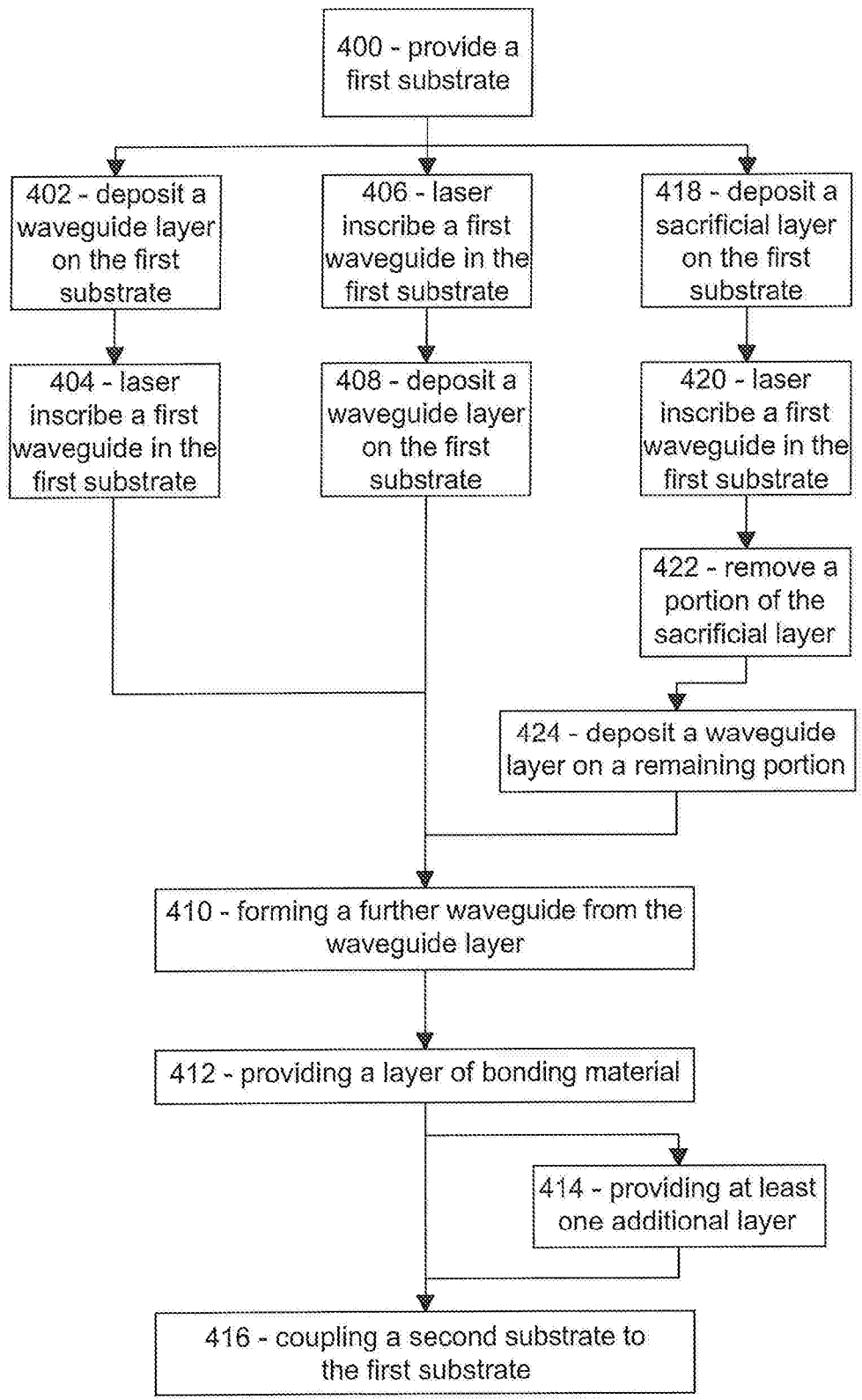
FIG. 17 shows a schematic of a manufacturing process according to an embodiment.

FIG. 17 shows an example process flow for manufacturing the optical apparatus of one or more of the embodiments described herein. In a first step 400, a first substrate 22 is provided. The process flow depicts several different ways to manufacture the optical apparatus. In a step 402 of a first process, a waveguide layer 52 is deposited on the first substrate 22. In a step 404 of the first process, a first waveguide 26 is inscribed in the first substrate 22. Laser inscribing after the waveguide layer 52 (or any other layer) has been deposited on the first substrate 22 may allow the first waveguide 26 to be fabricated closer to the interface 30 than would otherwise be possible if no waveguide layer 52 (or any other layer is provided). One possible reason for this may be the reduced ablation threshold at the interface 30 resulting from the provision of the waveguide layer 52 (or any other layer). In a second, alternative process, the order of the steps 402, 404 is swapped. After step 400 in the second process, in a step 406, a first waveguide 26 is inscribed in the first substrate 22. After step 406, in a step 408, a waveguide layer 52 is deposited on the first substrate 22. After step 404 or step 408, at step 410 a further waveguide 54 is formed in the waveguide layer 52 (e.g. using a patterning process and subsequent material removal process, or the like). If no further waveguide 54 is provided, step 410 may be considered an optional step.

At an optional step 412, a layer of bonding material 32 is provided. The layer of bonding material 32 may be provided on the further waveguide 54 and/or on another layer provided on the further waveguide 54 (for example as depicted by FIGS. 15 to 16). At optional step 414 at least one additional layer (such as a cladding material, or the like) is provided. Although depicted as occurring after step 412, the at least one additional layer may be provided before the layer of bonding material 32 is provided. At optional step 416, a second substrate 24 is coupled to the first substrate 22 (and any layers therebetween) using the layer of bonding material 32. The second substrate 22 may comprise a second waveguide 28, which may be appropriately positioned with respect to the first waveguide 22 and/or the further waveguide 54 to facilitate evanescent wave coupling. The second waveguide 28 may have been previously provided on the second substrate 24 (e.g. by a patterning process and subsequent material removal process). It will be appreciated that in some embodiments the second substrate 22 and/or the second waveguide 28 may not be provided.

After step 400 of a third process, in a step 418, a sacrificial layer (such as a cladding material 18) is provided on the first substrate 22. In step 420, laser inscription is used to provide a first waveguide 26 in the first substrate 22. In a step 422, a portion of the sacrificial layer is removed (e.g. by a patterning process and subsequent material removal process, or the like). In a step 424, a waveguide layer 52 is deposited on the remaining portion of the sacrificial layer (and any exposed portions of the first substrate 22). After step 424, at least one of the optional steps 410, 412, 414 and 416 may be performed as described herein.

It will be appreciated that the process steps of FIG. 17 could be applied more generally. For example, a method of manufacturing an optical apparatus may comprise providing a substrate; depositing a layer on the substrate; and laser inscribing a waveguide into the substrate proximal to an interface between the substrate and the layer. The substrate may be one of a first and second substrate 22, 24. The deposited layer may comprise at least one of: a waveguide layer 52, a cladding material 18, a layer of bonding material 32, or any other layer. The laser inscribed waveguide may be the first waveguide 26 and/or any other waveguide. The laser inscription may be performed before or after deposition of the layer. The optical apparatus may optionally comprise a second substrate 24 comprising a second waveguide 28. The optical apparatus may optionally comprise a waveguide layer 52 comprising a further waveguide 54. Any modifications may be made to the manufacturing process as appropriate. For example, layers described herein as being deposited on the first substrate 22 may be deposited on the second substrate 24 instead, or vice versa.

It will be appreciated that the method may additionally or alternative comprise forming the further waveguide 54 on a surface of the first substrate 22 and/or second substrate 24. The method may then comprise preparing or conditioning the surface of the first substrate 22 and/or second substrate 24, e.g. to reduce an amount of defects, such as for example cracks or mircocracks, and/or particles on the surface. The method may comprise preparing or conditioning the surface of the first substrate 22 and/or second substrate 24 prior to forming the further waveguide 54. This may mitigate the use of a sacrificial layer. The further waveguide 54 may be formed on the surface of first substrate 22 and/or the second substrate 24, as described above, for example in relation to step 410 of the process flow shown in FIG. 17.

In will be appreciated that in some embodiments the method may additionally or alternative comprise coupling the first substrate 22 and the second substrate 24 together using a welding technique, such as laser beam welding. This may avoid the provision of the bonding material at the interface 30.

Figure 18A:
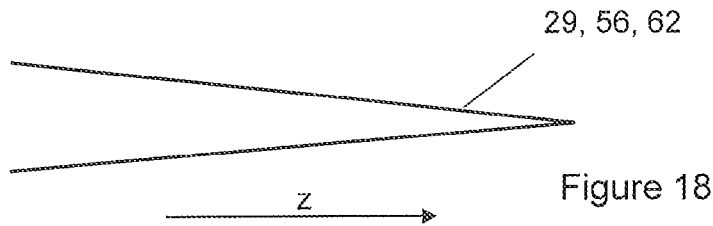
FIGS. 18a to 18d show cross-sectional views of exemplary waveguide configurations.

FIGS. 18a to 18f show cross-sectional views of exemplary waveguide configurations for use in the optical apparatus of any embodiment described herein. It will be appreciated that the exemplary waveguide configurations shown in FIGS. 18a to 18f may be used in any combination or in isolation. FIG. 18a shows an exemplary tapered section 29, 56, 62 that may be part of or comprised in the first waveguide 26, the second waveguide 28 and/or the further waveguide 54, respectively. The tapered section 29, 56, 62 shown in FIG. 18a comprises a width or thickness that varies, e.g. decreases in this example, in a first direction z and/or a second direction. The first direction z may be considered as comprising a direction along the first waveguide 26, the second waveguide 28 and/or the further waveguide 54, e.g. a propagation direction of the optical signal in the first waveguide 26, the second waveguide and/or the further waveguide 54. The second direction may comprise a direction that is perpendicular to the first direction z. It will be appreciated that in other embodiments the tapered section of the first waveguide, the second waveguide and/or the further waveguide may be configured such that a width or thickness of the tapered section increases in the first direction and/or the second direction.

Figure 18B:
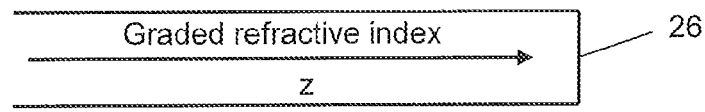

FIG. 18b shows an exemplary configuration of the first waveguide 26 for use in the optical apparatus of any embodiment described herein. The first waveguide 26 may be configured such that the refractive index of part or all of the first waveguide 26 varies, e.g. continuously varies, in the first direction z and/or second direction. For example, the first waveguide 26 may be configured such that the refractive index of part or all of the first waveguide 26 may decrease in the first direction z and/or the second direction, as for example shown in FIG. 18b. Alternatively, the first waveguide may be configured such that the refractive index of part or all of the first waveguide may increase in the first direction z and/or the second direction. The refractive index of part or all of the first waveguide may be varied, e.g. continuously varied, in the first direction z and/or the second direction, by varying, e.g. continuously varying, the refractive index contrast $\Delta n$ between the part or all of first waveguide 26 and the surrounding material of the first substrate 22. The refractive index of the part or all of the first waveguide 22 may be varied using laser inscription of the first substrate 22. By using laser inscription of the first substrate 22, the formation of a first waveguide 26 comprising a refractive index that may vary, e.g. continuously vary, may be facilitated. It will be appreciated that the features described above in relation to FIG. 18b may be applied to or comprised in the second waveguide and/or further waveguide.

Figure 18C:
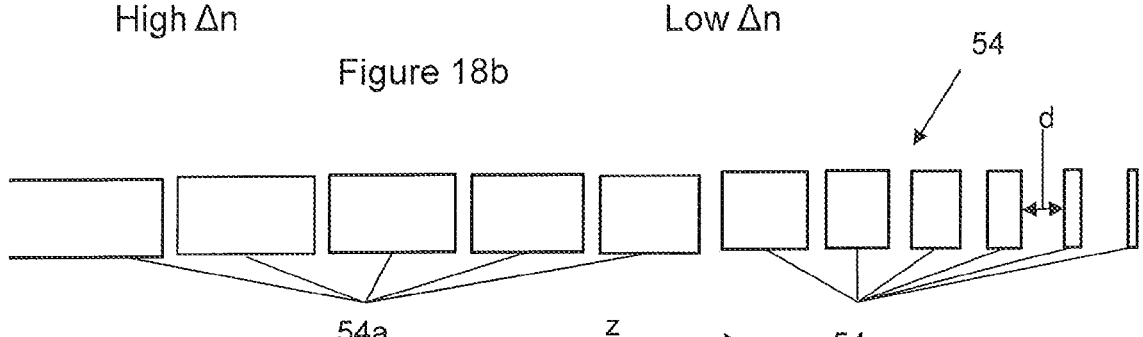

FIG. 18c shows an exemplary configuration of the further waveguide 54 for use in the optical apparatus of any embodiment described herein. The further waveguide 54 may be configured to comprise a plurality of segments 54a. The plurality of segments 54a may be arranged along the first direction z. Some or all segments of the plurality segments 54a may comprise the same refractive index. The plurality of parts or segments 54a may be arranged such that a refractive index, e.g. an effective refractive index, of the further waveguide 54 varies in the first direction z and/or the second direction. For example, the further waveguide 54 may be configured such that a size or width of some or all segments of the plurality of parts or segments 54a varies in the first direction z and/or the second direction. For example, as shown in FIG. 18c, the further waveguide 54 may be configured such that the size or width of some or all of the plurality of segments 54 decreases in the first direction z and/or the second direction. This may result in the refractive index, e.g. the effective refractive index, of the further waveguide 54 decreasing in the first direction z and/or the second direction. The further waveguide 54 may be configured such that a space or distance d between at least two or all segments of the plurality of segments 54a varies in the first direction z. For example, as shown in FIG. 18c, the further waveguide 54 may be configured such that the space or distance d between at least two or all segments of the plurality of segments 54 increases in the first direction z. This may result in the refractive index, e.g. the effective refractive index, of the further waveguide decreasing in the first direction z and/or the second direction. It will be appreciated that in other embodiments the further waveguide may be configured such that the size or width of some or all of the plurality of segments increases in the first direction z and/or the second direction and/or the space or distance between at least two or all segments of the plurality of segments decreases in the first direction.

Figure 18D:
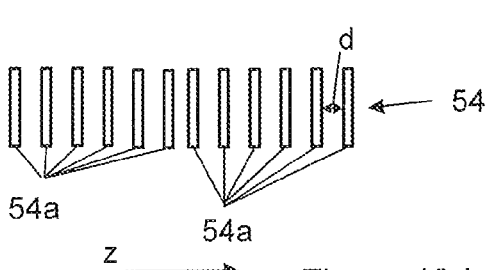
Figure 18E:
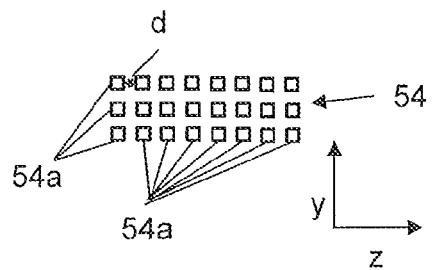
FIG. 18e shows a plan view of an exemplary waveguide configuration.

FIGS. 18d and 18e shows an exemplary configuration of the further waveguide 54 for use in the optical apparatus of any embodiment described herein. The exemplary further waveguide 54 shown in FIG. 18d is similar to that shown in FIG. 18d. However, the further waveguide 54 shown in FIG. 18d may be configured such that the size or width of some or all segments of the plurality of segments 54a is the same. The further waveguide 54 may be configured such that the space or distance d between at least two or all parts or segments of the plurality of parts or segments is the same. The further waveguide 54 may be configured such that the size or width of some or all segments of the plurality of segment 54a is smaller than a wavelength of the optical signal. The further waveguide 54 may be configured such that the space or distance d between at least two or all segments of the plurality of segment 54a is smaller than a wavelength of the optical signal in the further waveguide 54. FIG. 18e shows a plan view of an exemplary configuration of the further waveguide 54. The plurality of segments 54a may be arranged along the second direction (indicated in FIG. 18e by the y-direction). In other words, the plurality of segments 54*a*, e.g. some or all segments thereof, may be arranged to form an array of segments 54*a*. Some or all of the plurality of segments 54*a* may be considered as forming a metamaterial. Some or all of the plurality of segments 54*a* may be arranged to vary, e.g. decrease or increase, the refractive index, e.g. the effective refractive index, of the further waveguide 54. It will be appreciated that the plurality of segments are not limited to the shape shown in FIGS. 18*d* and 18*e*. For example, some or all segments of the plurality of segments may have any suitable shape or cross-section, such as for example a circular, elliptical, rectangular, square shape of cross-section or the like.

It will be appreciated that the features described above in relation to FIGS. 18*d* and 18*e* may equally be applied to or comprised in the first waveguide and/or second waveguide 28.

Figure 18F:
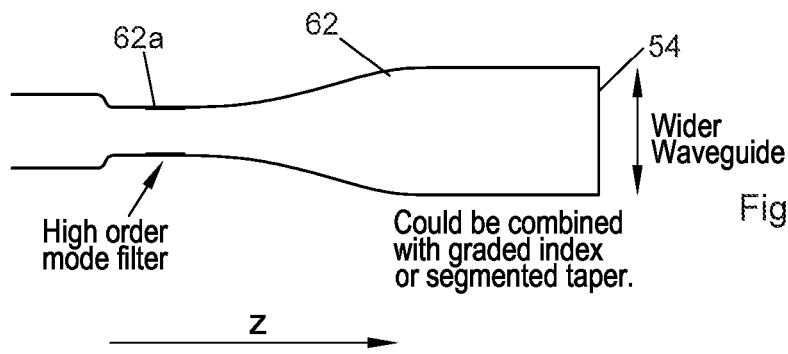
FIG. 18f shows a cross-sectional view of an exemplary waveguide configuration.

FIG. 18*f* shows an exemplary configuration of the further waveguide 54 for use in the optical apparatus of any embodiment described herein. When the width or thickness of the tapered section 62 increases in the first direction z and/or the second direction, the further waveguide 54 may comprise a constricted section 62*a*. The constricted section 62*a* may comprise a width or thickness, e.g. in the first direction z and/or the second direction, that is smaller or narrower than a width or thickness of the tapered section 62, e.g. in the first direction z and/or the second direction. The constricted section 62*a* may be arranged spaced or at a distance from the tapered section 62 of the further waveguide 54. The constricted section may be configured to filter one or more modes of the optical signal in the further waveguide 54. The constricted section 62*a* may be arranged to allow transmission of a single mode of the optical signal into the tapered section 62 of the further waveguide 54.

It will be appreciated that the features described above in relation to FIG. 18*f* may equally be applied to or comprised in the first waveguide and/or second waveguide 28.

As described above, the first waveguide according to any exemplary configuration shown and described in relation to FIGS. 18*a* to 18*f* may be formed using laser inscription. The second waveguide and/or further waveguide according to any exemplary configuration shown and described in relation to FIGS. 18*a* to 18*f* may be formed using deposition and/or lithographic techniques (e.g. using a patterning and process and subsequent material removal process), as for example described above.

Some or all of the exemplary configurations shown and described in relation to FIGS. 18*a* to 18*f* may allow for relaxed alignment tolerances, ease of fabrication and/or compatibility with existing processes or tools in foundries.

Figure 19:
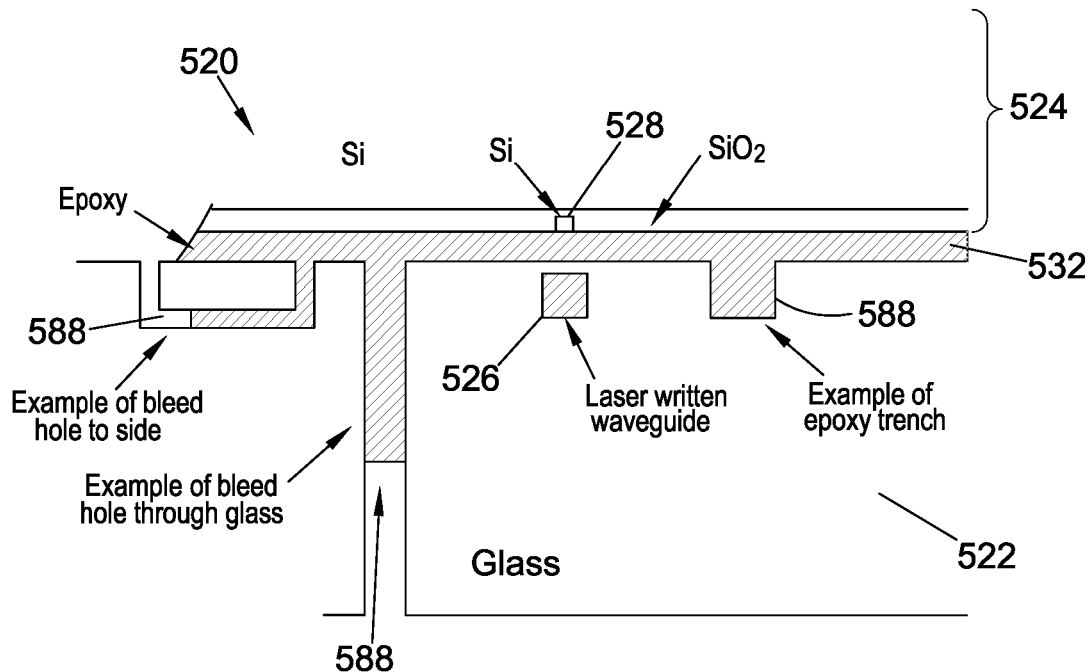
FIG. 19 shows a cross-sectional schematic view of an optical apparatus according to an embodiment.

FIG. 19 shows a cross-sectional schematic view of an optical apparatus 520 according to a further embodiment. The embodiment of FIG. 19 is similar to the optical apparatus 20 described herein but with similar features indicated by reference numerals incremented by 500. Different features are described herein.

The optical apparatus 520 may comprise at least one opening 588. The opening 588 may be part of or comprised in the first substrate 522. In FIG. 19, the optical apparatus 520 comprises three openings 588. It will be appreciated that in other embodiments, the optical apparatus may comprise more or less than three openings. The openings 588 may be provided in the form of a channel, hole, through-hole, bleed-hole, vent or the like, or a combination thereof. The openings 588 may be arranged to allow passage of gas from a space between the first substrate 522 and second substrate 524, e.g. when the first substrate 522 and second substrate 524 are coupled together. The openings 588 may be arranged to allow passage of the bonding material 532 into at least part of each opening 588, e.g. when the first substrate and second substrate are coupled together, e.g. using the bonding material 532. This may allow for control of the alignment and/or coupling between the first substrate and second substrate, e.g. control of a distance between the first substrate and second substrate, and/or for the first substrate and second substrate to be closely brought together. The opening 588 may be formed using another material removal process, such as for example, etching, e.g. laser assisted etching, dry etching or wet etching, or ablation, e.g. laser ablation, or masking.

Figure 20:
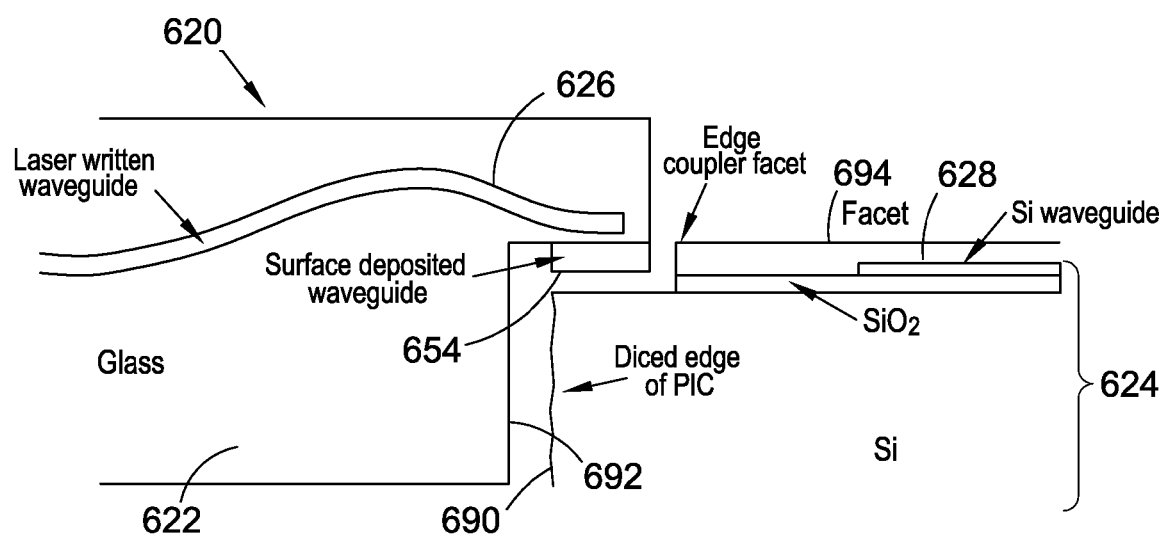
FIG. 20 shows a cross-sectional schematic view of an optical apparatus according to an embodiment.

FIG. 20 shows a cross-sectional schematic view of an optical apparatus 620 according to a further embodiment. The embodiment of FIG. 19 is similar to the optical apparatus 50 described herein but with similar features indicated by reference numerals incremented by 600. Different features are described herein.

For some applications of the optical apparatus 50 or parts thereof, such as for example in edge coupling applications, the second waveguide may comprise a side or facet that has been conditioned using a material removal process, such as etching, e.g. reactive ion etching (RIE). This may result in a ledge-type arrangement of the second substrate 624, in which the second waveguide 628 is located at a distance from a first edge 690 of the second substrate 624. In this example, the first substrate 622 may be shaped or configured to allow for coupling, e.g. complementary coupling, with the second substrate 624. For example, the first substrate 622 may be shaped or configured to allow for butt coupling between the further waveguide 654 provided on the first substrate 622 and the second waveguide 628. For example, the first substrate 622 may comprise a second edge 692. The second edge 692 may be shaped to complementarily match the first edge 690 of the first substrate 624. In other words, the second edge 692 may be shaped or configured such that the first and second edges 690, 692 define opposing edges, e.g. to allow for complementary coupling together of the first substrate 622 and the second substrate 624. This may allow for the further waveguide 654 being brought into close proximity of the second waveguide, thereby reducing a distance between the further waveguide and the second waveguide, which may reduce losses of the optical signal over the distance between the further waveguide and the second wave guide. The further waveguide may be formed on at least part of the second edge 692. The second substrate 624 may comprise a coupling portion 694. The coupling portion 694 may be provided in the form of an edge coupler or edge coupling portion 694. The coupling portion 694 may be arranged to allow for butt coupling between the further waveguide 654 and the second waveguide 628, e.g. when the first substrate 622 and second substrate 624 are coupled together. The coupling portion 694 may comprise at least one of silicon dioxide ($SiO_2$) (or silica) and silicon nitride. It will be appreciated that the coupling portion is not limited to comprising at least one of silicon dioxide and silicon nitride and that in other embodiments the coupling portion may comprise another suitable material. The coupling portion 694 may be configured to vary, e.g. increase, a mode field diameter, e.g. to allow for butt coupling between the further waveguide 654 and the second waveguide 628.

The further waveguide 654 may be arranged relative to the second waveguide 628 such that a propagation direction of the optical signal in the further waveguide 654 corresponds to or is the same as a propagation direction of the optical signal in the second waveguide 628, e.g. when the first substrate and second substrate are coupled together.

The optical apparatus described herein comprises a first and second substrate. However, it will be appreciated that the optical apparatus may be considered as only comprising the first substrate or only comprising the second substrate. The second waveguide may be regarded as an example of an additional waveguide. The further waveguide may be regarded as an example of an additional waveguide. Optical apparatus described herein may comprise one or a plurality of additional waveguides, for example, either one or both of the second and further waveguides described herein.

Various references are made to the terms "substrate" and "layer" throughout this disclosure. It will be understood that in some contexts, the terms may be interchangeable such that a layer may be considered a substrate. In other contexts, a substrate may be considered to be substrate.

The applicant discloses in isolation each individual feature described herein and any combination of two or more such features, to the extent that such features or combinations are capable of being carried out based on the specification as a whole in the light of the common general knowledge of a person skilled in the art, irrespective of whether such features or combinations of features solve any problems disclosed herein, and without limitation to the scope of the claims. The applicant indicates that aspects of the invention may consist of any such individual feature or combination of features. In view of the foregoing description it will be evident to a person skilled in the art that various modifications may be made within the scope of the invention.

The invention claimed is:

1. Optical apparatus comprising:
   a first substrate comprising a first waveguide formed by laser inscription of the first substrate; and
   a second substrate comprising a second waveguide, wherein the first waveguide comprises a curved section configured to provide evanescent coupling of an optical signal across an interface between the first and second waveguides;
   the optical apparatus further comprises a further waveguide on the first substrate;
   the second substrate has a ledge-type arrangement that comprises an edge coupler;
   the first substrate has a shape that is complementary to the shape of the ledge-type arrangement of the second substrate to provide complementary coupling of the first substrate and the second substrate; and
   the edge coupler is configured to provide coupling between the further waveguide and the second waveguide when the first substrate and the second substrate are coupled, thereby providing coupling of an optical signal between the first waveguide and the second waveguide via the further waveguide.

2. The optical apparatus of claim 1, wherein at least one of a) or b):
   a) the first substrate comprises at least one of: a glass; or amorphous material;
   b) the first waveguide defines a three-dimensional structure so that a centerline of the first waveguide extends in three dimensions.

3. The optical apparatus of claim 1, wherein the further waveguide is provided between the first and second substrates for providing evanescent coupling between the first waveguide and the second waveguide.

4. The optical apparatus of claim 3, wherein at least one of a), b) or c):
   a) the further waveguide comprises at least one of: silicon oxynitride; germanium doped silica; or silicon nitride;
   b) the second waveguide of the second substrate comprises a material of higher refractive index than the first waveguide and the further waveguide, and wherein the further waveguide comprises a material having a higher refractive index than the first waveguide;
   c) the further waveguide is provided in a removed portion of a sacrificial layer deposited on the first substrate.

5. The optical apparatus of claim 1, wherein the curved section is proximal to the interface and extends in a plane parallel to a propagation direction of the evanescently coupled optical signal, and wherein the plane is perpendicular to the interface.

6. The optical apparatus of claim 1, wherein at least one of a), b), c), d), e) or f):
   a) the first waveguide further comprises a straight section adjacent to the curved section and proximal to the interface, wherein the first waveguide is positioned relative to the second waveguide such that the straight section is parallel to a proximal portion of the second waveguide;
   b) a radius of curvature of the curved section is defined by a geometrical relation between a portion of the first waveguide distal to the interface and a portion of the first waveguide proximal to the interface, wherein the portion of the first waveguide proximal to the interface is shaped such that an evanescent field of the optical signal is permitted to propagate through the portion between the first and second waveguides;
   c) a refractive index of the first waveguide varies as function of position along the first waveguide;
   d) the first waveguide is configured such that a refractive index of part or all of the first waveguide decreases in a first direction and/or a second direction, the first direction comprising a direction along the first waveguide and/or the second direction comprising a direction that is perpendicular to the first direction;
   e) the second waveguide comprises a material of higher refractive index than the first waveguide;
   f) the material of the second waveguide comprises at least one of: silicon; silicon nitride; or indium phosphide.

7. The optical apparatus of claim 1, comprising an electrical component configured to at least one of: convert the optical signal into an electrical signal; or convert an electrical signal into the optical signal.

8. The optical apparatus of claim 7, wherein at least one of a) or b):
   a) the electrical component is configured to at least one of: transmit; or receive the optical signal via the second waveguide;
   b) the apparatus further comprises a carrier configured to provide at least one of: optical, electrical or magnetic communication with the electrical component.

9. The optical apparatus of claim 1, wherein at least one of a), b) or c):
   a) the second waveguide comprises a splitter with a plurality of transversely spaced apart tapered sections for providing adiabatic evanescent coupling with the first waveguide;
   b) the apparatus further comprises at least one spacing element disposed between the first and second substrates and at least one recessed region in at least one layer disposed between the first and second substrates, wherein the at least one spacing element is provided in the at least one recessed region;
   c) a radius of curvature of the curved section varies as function of position along the first waveguide.

10. The optical apparatus of claim 1, wherein the first substrate comprises at least one opening, the opening being arranged to allow passage of gas from a space between the first substrate and the second substrate and/or to allow passage of a bonding material into at least part of the opening, when the first and second substrates are coupled together.

11. The optical apparatus of claim 1, wherein at least one of the first substrate or the second substrate is configured or shaped to allow for complementarily coupling with at least one other of the first substrate and the second substrate.

12. Optical apparatus for evanescently coupling an optical signal across an interface between a first waveguide formed by laser inscription of a first substrate and an additional waveguide, the optical apparatus comprising:
the first substrate, wherein the first waveguide comprises a curved section configured to provide evanescent coupling of the optical signal between the first waveguide and the additional waveguide; and
the additional waveguide, wherein the additional waveguide comprises a second waveguide of a second substrate;
the optical apparatus further comprises a further waveguide on the first substrate;
the second substrate has a ledge-type arrangement that comprises an edge coupler;
the first substrate has a shape that is complementary to the shape of the ledge-type arrangement of the second substrate to provide complementary coupling of the first substrate and the second substrate; and
the edge coupler is configured to provide coupling between the further waveguide and the second waveguide when the first substrate and the second substrate are coupled, thereby providing coupling of an optical signal between the first waveguide and the second waveguide via the further waveguide.

13. The optical apparatus of claim 12, wherein the further waveguide and/or the second waveguide comprises a tapered section.

14. The optical apparatus of claim 13, wherein the tapered section is configured such that a width of the tapered section increases or decreases in a first direction and/or a second direction, the first direction comprising a direction along the further waveguide and/or second waveguide and/or the second direction comprising a direction that is perpendicular to the first direction.

15. The optical apparatus of claim 14, wherein, when the width of the tapered section increases in the first direction and/or the second direction, the further waveguide and/or second waveguide comprises a constricted section, the constricted section being configured to filter one or more modes of the optical signal and/or being arranged to allow transmission of a single mode of the optical signal into the tapered section of the second waveguide.

16. The optical apparatus of claim 12, wherein the second waveguide is configured to comprise a plurality of parts or segments, the plurality of parts or segments being arranged such that a refractive index of the further waveguide and/or second waveguide varies in a first direction and/or a second direction, the first direction comprising a direction along the further waveguide and/or second waveguide and/or the second direction comprising a direction that is perpendicular to the first direction.

17. A method of manufacturing an optical apparatus, the method comprising:
providing a first substrate;
forming a first waveguide in the first substrate by laser inscription so that the first waveguide comprises a curved section;
providing a second substrate comprising a second waveguide;
coupling the first substrate and second substrate together so that the curved section is configured to provide evanescent coupling of an optical signal across an interface between the first waveguide and the second waveguide; and
providing a further waveguide on the first substrate;
the second substrate has a ledge-type arrangement that comprises an edge coupler;
the first substrate has a shape that is complementary to the shape of the ledge-type arrangement of the second substrate to provide complementary coupling of the first substrate and the second substrate; and
the edge coupler is configured to provide coupling between the further waveguide and the second waveguide when the first substrate and the second substrate are coupled, thereby providing coupling of an optical signal between the first waveguide and the second waveguide via the further waveguide.

18. A method of manufacturing an optical apparatus, the method comprising:
providing a first substrate;
depositing a sacrificial layer on the first substrate;
laser inscribing the first waveguide in the first substrate;
removing a portion of the sacrificial layer to expose a portion of the first substrate;
providing a further waveguide on the exposed portion of the first substrate; and
providing a second substrate comprising a second waveguide;
the second substrate has a ledge-type arrangement that comprises an edge coupler;
the first substrate has a shape that is complementary to the shape of the ledge-type arrangement of the second substrate to provide complementary coupling of the first substrate and the second substrate; and
the edge coupler is configured to provide coupling between the further waveguide and the second waveguide when the first substrate and the second substrate are coupled, thereby providing coupling of an optical signal between the first waveguide and the second waveguide via the further waveguide.

19. The method of claim 18, wherein providing the further waveguide comprises:
depositing a waveguide layer on at least one of: a remaining portion of the sacrificial layer or the exposed portion of the first substrate; and
removing one or more parts of the waveguide layer to form the further waveguide.

20. The method of claim 18, wherein the first waveguide is configured such that the first waveguide comprises a curved section configured to provide evanescent coupling of an optical signal across an interface between the first waveguide and the second waveguide, and via the further waveguide.

21. The method of claim 18, wherein the laser inscribing step is performed one of: before the sacrificial layer is deposited on the first substrate; or after the sacrificial layer is deposited on the first substrate.

* * * * *

UNITED STATES PATENT AND TRADEMARK OFFICE
CERTIFICATE OF CORRECTION

PATENT NO. : 11,415,749 B2  
APPLICATION NO. : 16/975978  
DATED : August 16, 2022  
INVENTOR(S) : Nicholas D. Psaila et al.

Page 1 of 1

It is certified that error appears in the above-identified patent and that said Letters Patent is hereby corrected as shown below:

On the Title Page

On page 2, before Item (51), add:
"Related U.S. Application Data
(60) Continuation of application No. 16/006,177, filed on Jun. 12, 2018, now Patent No. 10,698,164."

Signed and Sealed this
First Day of April, 2025

Coke Morgan Stewart
*Acting Director of the United States Patent and Trademark Office*